(12) United States Patent  
Turetzky et al.

(10) Patent No.: US 9,208,608 B2
(45) Date of Patent: Dec. 8, 2015

(54) SYSTEMS AND METHODS FOR FEATURE TRACKING

(71) Applicant: GLASSES.COM, INC., Mason, OH (US)

(72) Inventors: Darren Turetzky, Cedar Park, TX (US); Ryan Travis Engle, Pflugerville, TX (US)

(73) Assignee: GLASSES.COM, INC., Mason, OH (US)

( * ) Notice: Subject to any disclaimer, the term of this patent is extended or adjusted under 35 U.S.C. 154(b) by 108 days.

(21) Appl. No.: 13/775,764

(22) Filed: Feb. 25, 2013

(65) Prior Publication Data

US 2013/0315487 A1 Nov. 28, 2013

Related U.S. Application Data

(60) Provisional application No. 61/650,983, filed on May 23, 2012, provisional application No. 61/735,951, filed on Dec. 11, 2012.

(51) Int. Cl.
*G06T 19/00* (2011.01)
*G06T 17/00* (2006.01)
*G06T 15/04* (2011.01)
(Continued)

(52) U.S. Cl.
CPC ............ *G06T 17/00* (2013.01); *G06K 9/00221* (2013.01); *G06K 9/46* (2013.01); *G06T 15/04* (2013.01); *G06T 19/00* (2013.01); *G06T 19/006* (2013.01); *G02C 13/003* (2013.01); *G06T 2210/16* (2013.01)

(58) Field of Classification Search
CPC ............ G06K 9/14; G06K 9/38; G06K 9/46; G06K 9/48; G06K 9/52–9/527; G06K 9/623; G06T 7/0081
USPC ......................................................... 382/195
See application file for complete search history.

(56) References Cited

U.S. PATENT DOCUMENTS 3,927,933 A 12/1975 Humphrey
4,370,058 A 1/1983 Trötscher et al.
(Continued)

FOREIGN PATENT DOCUMENTS

DE 10007705 A1 9/2001
EP 0092364 A1 10/1983
(Continued)

OTHER PUBLICATIONS (Tracker, "Tracker Help", Nov. 2009).*
(Continued)

*Primary Examiner* — Siamak Harandi
(74) *Attorney, Agent, or Firm* — Holland & Hart LLP

(57) ABSTRACT

A computer-implemented method for processing, by a graphical processor unit (GPU), a plurality of images of a user. A plurality of features detected by the GPU in a first image of the plurality of images of the user is selected. Each selected feature includes one or more pixels. In a second image of the plurality of images of the user, a search is performed for the plurality of features selected in the first image. A variance is calculated, on the GPU, for each selected feature found in the second image. The variance indicates a degree to which a portion of the second image varies from a corresponding portion of the first image. The calculated variance is stored in a variance file.

20 Claims, 11 Drawing Sheets

(51) Int. Cl.
  *G06K 9/46* (2006.01)
  *G06K 9/00* (2006.01)
  *G02C 13/00* (2006.01)

(56) References Cited

U.S. PATENT DOCUMENTS

| | | |
|---|---|---|
| 4,467,349 A | 8/1984 | Maloomian |
| 4,522,474 A | 6/1985 | Slavin |
| 4,534,650 A | 8/1985 | Clerget et al. |
| 4,539,585 A | 9/1985 | Spackova et al. |
| 4,573,121 A | 2/1986 | Saigo et al. |
| 4,613,219 A | 9/1986 | Vogel |
| 4,698,564 A | 10/1987 | Slavin |
| 4,724,617 A | 2/1988 | Logan et al. |
| 4,730,260 A | 3/1988 | Mori et al. |
| 4,781,452 A | 11/1988 | Ace |
| 4,786,160 A | 11/1988 | Fürter |
| 4,845,641 A | 7/1989 | Ninomiya et al. |
| 4,852,184 A | 7/1989 | Tamura et al. |
| 4,957,369 A | 9/1990 | Antonsson |
| 5,139,373 A | 8/1992 | Logan et al. |
| 5,255,352 A | 10/1993 | Falk |
| 5,257,198 A | 10/1993 | van Schoyck |
| 5,280,570 A | 1/1994 | Jordan |
| 5,281,957 A | 1/1994 | Schoolman |
| 5,428,448 A | 6/1995 | Albert-Garcia |
| 5,485,399 A | 1/1996 | Saigo et al. |
| 5,550,602 A | 8/1996 | Braeuning |
| 5,592,248 A | 1/1997 | Norton et al. |
| 5,631,718 A | 5/1997 | Markovitz et al. |
| 5,666,957 A | 9/1997 | Juto |
| 5,682,210 A | 10/1997 | Weirich |
| 5,720,649 A | 2/1998 | Gerber et al. |
| 5,724,522 A | 3/1998 | Kagami et al. |
| 5,774,129 A | 6/1998 | Poggio et al. |
| 5,809,580 A | 9/1998 | Arnette |
| 5,844,573 A | 12/1998 | Poggio et al. |
| 5,880,806 A | 3/1999 | Conway |
| 5,908,348 A | 6/1999 | Gottschald |
| 5,974,400 A | 10/1999 | Kagami et al. |
| 5,980,037 A | 11/1999 | Conway |
| 5,983,201 A | 11/1999 | Fay |
| 5,987,702 A | 11/1999 | Simioni |
| 5,988,862 A | 11/1999 | Kacyra et al. |
| D417,883 S | 12/1999 | Arnette |
| 6,016,150 A | 1/2000 | Lengyel et al. |
| 6,018,339 A | 1/2000 | Stevens |
| D420,037 S | 2/2000 | Conway |
| D420,379 S | 2/2000 | Conway |
| D420,380 S | 2/2000 | Simioni et al. |
| 6,024,444 A | 2/2000 | Little |
| D421,764 S | 3/2000 | Arnette |
| D422,011 S | 3/2000 | Conway |
| D422,014 S | 3/2000 | Simioni et al. |
| D423,034 S | 4/2000 | Arnette |
| D423,552 S | 4/2000 | Flanagan et al. |
| D423,553 S | 4/2000 | Brune |
| D423,554 S | 4/2000 | Conway |
| D423,556 S | 4/2000 | Conway |
| D423,557 S | 4/2000 | Conway |
| D424,094 S | 5/2000 | Conway |
| D424,095 S | 5/2000 | Brune et al. |
| D424,096 S | 5/2000 | Conway |
| D424,589 S | 5/2000 | Arnette |
| D424,598 S | 5/2000 | Simioni |
| D425,542 S | 5/2000 | Arnette |
| D425,543 S | 5/2000 | Brune |
| D426,568 S | 6/2000 | Conway |
| D427,225 S | 6/2000 | Arnette |
| D427,227 S | 6/2000 | Conway |
| 6,072,496 A | 6/2000 | Guenter et al. |
| 6,095,650 A | 8/2000 | Gao et al. |
| 6,102,539 A | 8/2000 | Tucker |
| D430,591 S | 9/2000 | Arnette |
| D432,156 S | 10/2000 | Conway et al. |
| D433,052 S | 10/2000 | Flanagan |
| 6,132,044 A | 10/2000 | Sternbergh |
| 6,139,141 A | 10/2000 | Zider |
| 6,139,143 A | 10/2000 | Brune et al. |
| 6,142,628 A | 11/2000 | Saigo |
| 6,144,388 A | 11/2000 | Bornstein |
| D434,788 S | 12/2000 | Conway |
| D439,269 S | 3/2001 | Conway |
| 6,208,347 B1 | 3/2001 | Migdal et al. |
| 6,222,621 B1 | 4/2001 | Taguchi et al. |
| 6,231,188 B1 | 5/2001 | Gao et al. |
| 6,233,049 B1 | 5/2001 | Kondo et al. |
| 6,246,468 B1 | 6/2001 | Dimsdale |
| 6,249,600 B1 | 6/2001 | Reed et al. |
| 6,281,903 B1 | 8/2001 | Martin et al. |
| 6,305,656 B1 | 10/2001 | Wemyss |
| 6,307,568 B1 | 10/2001 | Rom |
| 6,310,627 B1 | 10/2001 | Sakaguchi |
| 6,330,523 B1 | 12/2001 | Kacyra et al. |
| 6,356,271 B1 | 3/2002 | Reiter et al. |
| 6,377,281 B1 | 4/2002 | Rosenbluth et al. |
| 6,386,562 B1 | 5/2002 | Kuo |
| 6,415,051 B1 | 7/2002 | Callari et al. |
| 6,419,549 B2 | 7/2002 | Shirayanagi |
| 6,420,698 B1 | 7/2002 | Dimsdale |
| 6,434,278 B1 | 8/2002 | Hashimoto |
| 6,456,287 B1 | 9/2002 | Kamen et al. |
| 6,466,205 B2 | 10/2002 | Simpson et al. |
| 6,473,079 B1 | 10/2002 | Kacyra et al. |
| 6,492,986 B1 | 12/2002 | Metaxas et al. |
| 6,493,073 B2 | 12/2002 | Epstein |
| 6,508,553 B2 | 1/2003 | Gao et al. |
| 6,512,518 B2 | 1/2003 | Dimsdale |
| 6,512,993 B2 | 1/2003 | Kacyra et al. |
| 6,516,099 B1 | 2/2003 | Davison et al. |
| 6,518,963 B1 | 2/2003 | Waupotitsch et al. |
| 6,527,731 B2 | 3/2003 | Weiss et al. |
| 6,529,192 B1 | 3/2003 | Waupotitsch |
| 6,529,626 B1 | 3/2003 | Watanabe et al. |
| 6,529,627 B1 | 3/2003 | Callari et al. |
| 6,533,418 B1 | 3/2003 | Izumitani et al. |
| 6,535,223 B1 | 3/2003 | Foley |
| 6,556,196 B1 | 4/2003 | Blanz et al. |
| 6,563,499 B1 | 5/2003 | Waupotitsch et al. |
| 6,583,792 B1 | 6/2003 | Agnew |
| 6,624,843 B2 | 9/2003 | Lennon |
| 6,634,754 B2 | 10/2003 | Fukuma et al. |
| 6,637,880 B1 | 10/2003 | Yamakaji et al. |
| 6,647,146 B1 | 11/2003 | Davison et al. |
| 6,650,324 B1 | 11/2003 | Junkins |
| 6,659,609 B2 | 12/2003 | Mothes |
| 6,661,433 B1 | 12/2003 | Lee |
| 6,664,956 B1 | 12/2003 | Erdem |
| 6,668,082 B1 | 12/2003 | Davison et al. |
| 6,671,538 B1 | 12/2003 | Ehnholm et al. |
| 6,677,946 B1 | 1/2004 | Ohba |
| 6,682,195 B2 | 1/2004 | Dreher |
| 6,692,127 B2 | 2/2004 | Abitbol et al. |
| 6,705,718 B2 | 3/2004 | Fossen |
| 6,726,463 B2 | 4/2004 | Foreman |
| 6,734,849 B2 | 5/2004 | Dimsdale et al. |
| 6,736,506 B2 | 5/2004 | Izumitani et al. |
| 6,760,488 B1 | 7/2004 | Moura et al. |
| 6,775,128 B2 | 8/2004 | Leitao |
| 6,785,585 B1 | 8/2004 | Gottschald |
| 6,791,584 B1 | 9/2004 | Xie |
| 6,792,401 B1 | 9/2004 | Nigro et al. |
| 6,807,290 B2 | 10/2004 | Liu et al. |
| 6,808,381 B2 | 10/2004 | Foreman et al. |
| 6,817,713 B2 | 11/2004 | Ueno |
| 6,825,838 B2 | 11/2004 | Smith et al. |
| 6,847,383 B2 | 1/2005 | Agnew |
| 6,847,462 B1 | 1/2005 | Kacyra et al. |
| 6,876,755 B1 | 4/2005 | Taylor et al. |
| 6,893,245 B2 | 5/2005 | Foreman et al. |
| 6,903,746 B2 | 6/2005 | Fukushima et al. |
| 6,907,310 B2 | 6/2005 | Gardner et al. |
| 6,922,494 B1 | 7/2005 | Fay |
| 6,943,789 B2 | 9/2005 | Perry et al. |

(56) References Cited

U.S. PATENT DOCUMENTS

| | | |
|---|---|---|
| 6,944,327 B1 | 9/2005 | Soatto |
| 6,950,804 B2 | 9/2005 | Strietzel |
| 6,961,439 B2 | 11/2005 | Ballas |
| 6,965,385 B2 | 11/2005 | Welk et al. |
| 6,965,846 B2 | 11/2005 | Krimmer |
| 6,968,075 B1 | 11/2005 | Chang |
| 6,980,690 B1 | 12/2005 | Taylor et al. |
| 6,999,073 B1 | 2/2006 | Zwern et al. |
| 7,003,515 B1 | 2/2006 | Glaser et al. |
| 7,016,824 B2 | 3/2006 | Waupotitsch et al. |
| 7,034,818 B2 | 4/2006 | Perry et al. |
| 7,043,059 B2 * | 5/2006 | Cheatle et al. ............... 382/112 |
| 7,051,290 B2 | 5/2006 | Foreman et al. |
| 7,062,722 B1 | 6/2006 | Carlin et al. |
| 7,069,107 B2 | 6/2006 | Ueno |
| 7,095,878 B1 | 8/2006 | Taylor et al. |
| 7,103,211 B1 | 9/2006 | Medioni et al. |
| 7,116,804 B2 | 10/2006 | Murase et al. |
| 7,133,048 B2 | 11/2006 | Brand |
| 7,152,976 B2 | 12/2006 | Fukuma et al. |
| 7,154,529 B2 | 12/2006 | Hoke et al. |
| 7,156,655 B2 | 1/2007 | Sachdeva et al. |
| 7,184,036 B2 | 2/2007 | Dimsdale et al. |
| 7,209,557 B2 | 4/2007 | Lahiri |
| 7,212,656 B2 | 5/2007 | Liu et al. |
| 7,212,664 B2 | 5/2007 | Lee et al. |
| 7,215,430 B2 | 5/2007 | Kacyra et al. |
| 7,218,323 B1 | 5/2007 | Halmshaw et al. |
| 7,219,995 B2 | 5/2007 | Ollendorf et al. |
| 7,224,357 B2 | 5/2007 | Chen et al. |
| 7,234,937 B2 | 6/2007 | Sachdeva et al. |
| 7,242,807 B2 | 7/2007 | Waupotitsch et al. |
| 7,290,201 B1 | 10/2007 | Edwards |
| 7,310,102 B2 | 12/2007 | Spicer |
| 7,324,110 B2 | 1/2008 | Edwards et al. |
| 7,415,152 B2 | 8/2008 | Jiang et al. |
| 7,421,097 B2 | 9/2008 | Hamza et al. |
| 7,426,292 B2 | 9/2008 | Moghaddam et al. |
| 7,434,931 B2 | 10/2008 | Warden et al. |
| 7,436,988 B2 | 10/2008 | Zhang et al. |
| 7,441,895 B2 | 10/2008 | Akiyama et al. |
| 7,450,737 B2 | 11/2008 | Ishikawa et al. |
| 7,489,768 B1 | 2/2009 | Strietzel |
| 7,492,364 B2 | 2/2009 | Devarajan et al. |
| 7,508,977 B2 | 3/2009 | Lyons et al. |
| 7,523,411 B2 | 4/2009 | Carlin |
| 7,530,690 B2 | 5/2009 | Divo et al. |
| 7,532,215 B2 | 5/2009 | Yoda et al. |
| 7,533,453 B2 | 5/2009 | Yancy |
| 7,540,611 B2 | 6/2009 | Welk et al. |
| 7,557,812 B2 | 7/2009 | Chou et al. |
| 7,563,975 B2 | 7/2009 | Leahy et al. |
| 7,573,475 B2 | 8/2009 | Sullivan et al. |
| 7,573,489 B2 | 8/2009 | Davidson et al. |
| 7,587,082 B1 | 9/2009 | Rudin et al. |
| 7,609,859 B2 | 10/2009 | Lee et al. |
| 7,630,580 B1 | 12/2009 | Repenning |
| 7,634,103 B2 | 12/2009 | Rubinstenn et al. |
| 7,643,685 B2 | 1/2010 | Miller |
| 7,646,909 B2 | 1/2010 | Jiang et al. |
| 7,651,221 B2 | 1/2010 | Krengel et al. |
| 7,656,402 B2 | 2/2010 | Abraham et al. |
| 7,657,083 B2 | 2/2010 | Parr et al. |
| 7,663,648 B1 | 2/2010 | Saldanha et al. |
| 7,665,843 B2 | 2/2010 | Xie |
| 7,689,043 B2 | 3/2010 | Austin et al. |
| 7,699,300 B2 | 4/2010 | Iguchi |
| 7,711,155 B1 | 5/2010 | Sharma et al. |
| 7,717,708 B2 | 5/2010 | Sachdeva et al. |
| 7,720,285 B2 | 5/2010 | Ishikawa et al. |
| D616,918 S | 6/2010 | Rohrbach |
| 7,736,147 B2 | 6/2010 | Kaza et al. |
| 7,755,619 B2 | 7/2010 | Wang et al. |
| 7,756,325 B2 | 7/2010 | Vetter et al. |
| 7,760,923 B2 | 7/2010 | Walker et al. |
| 7,768,528 B1 | 8/2010 | Edwards et al. |
| D623,216 S | 9/2010 | Rohrbach |
| 7,804,997 B2 | 9/2010 | Geng et al. |
| 7,814,436 B2 | 10/2010 | Schrag et al. |
| 7,830,384 B1 | 11/2010 | Edwards et al. |
| 7,835,565 B2 | 11/2010 | Cai et al. |
| 7,835,568 B2 | 11/2010 | Park et al. |
| 7,845,797 B2 | 12/2010 | Warden et al. |
| 7,848,548 B1 | 12/2010 | Moon et al. |
| 7,852,995 B2 | 12/2010 | Strietzel |
| 7,856,125 B2 | 12/2010 | Medioni et al. |
| 7,860,225 B2 | 12/2010 | Strietzel |
| 7,860,301 B2 | 12/2010 | Se et al. |
| 7,876,931 B2 | 1/2011 | Geng |
| 7,896,493 B2 | 3/2011 | Welk et al. |
| 7,907,774 B2 | 3/2011 | Parr et al. |
| 7,929,745 B2 | 4/2011 | Walker et al. |
| 7,929,775 B2 | 4/2011 | Hager et al. |
| 7,953,675 B2 | 5/2011 | Medioni et al. |
| 7,961,914 B1 | 6/2011 | Smith |
| 8,009,880 B2 | 8/2011 | Zhang et al. |
| 8,026,916 B2 | 9/2011 | Wen |
| 8,026,917 B1 | 9/2011 | Rogers et al. |
| 8,026,929 B2 | 9/2011 | Naimark |
| 8,031,909 B2 | 10/2011 | Se et al. |
| 8,031,933 B2 | 10/2011 | Se et al. |
| 8,059,917 B2 | 11/2011 | Dumas et al. |
| 8,064,685 B2 | 11/2011 | Solem et al. |
| 8,070,619 B2 | 12/2011 | Edwards |
| 8,073,196 B2 | 12/2011 | Yuan et al. |
| 8,090,160 B2 | 1/2012 | Kakadiaris et al. |
| 8,113,829 B2 | 2/2012 | Sachdeva et al. |
| 8,118,427 B2 | 2/2012 | Bonnin et al. |
| 8,126,242 B2 | 2/2012 | Brett et al. |
| 8,126,249 B2 | 2/2012 | Brett et al. |
| 8,126,261 B2 | 2/2012 | Medioni et al. |
| 8,130,225 B2 | 3/2012 | Sullivan et al. |
| 8,131,063 B2 | 3/2012 | Xiao et al. |
| 8,132,123 B2 | 3/2012 | Schrag et al. |
| 8,144,153 B1 | 3/2012 | Sullivan et al. |
| 8,145,545 B2 | 3/2012 | Rathod et al. |
| 8,155,411 B2 | 4/2012 | Hof et al. |
| 8,160,345 B2 | 4/2012 | Pavlovskaia et al. |
| 8,177,551 B2 | 5/2012 | Sachdeva et al. |
| 8,182,087 B2 | 5/2012 | Esser et al. |
| 8,194,072 B2 | 6/2012 | Jones et al. |
| 8,199,152 B2 | 6/2012 | Sullivan et al. |
| 8,200,502 B2 | 6/2012 | Wedwick |
| 8,204,299 B2 | 6/2012 | Arcas et al. |
| 8,204,301 B2 | 6/2012 | Xiao et al. |
| 8,204,334 B2 | 6/2012 | Bhagavathy et al. |
| 8,208,717 B2 | 6/2012 | Xiao et al. |
| 8,212,812 B2 | 7/2012 | Tsin et al. |
| 8,217,941 B2 | 7/2012 | Park et al. |
| 8,218,836 B2 | 7/2012 | Metaxas et al. |
| 8,224,039 B2 | 7/2012 | Ionita et al. |
| 8,243,065 B2 | 8/2012 | Kim |
| 8,248,417 B1 | 8/2012 | Clifton |
| 8,260,006 B1 | 9/2012 | Callari et al. |
| 8,260,038 B2 | 9/2012 | Xiao et al. |
| 8,260,039 B2 | 9/2012 | Shiell et al. |
| 8,264,504 B2 | 9/2012 | Naimark |
| 8,269,779 B2 | 9/2012 | Rogers et al. |
| 8,274,506 B1 | 9/2012 | Rees |
| 8,284,190 B2 | 10/2012 | Muktinutalapati et al. |
| 8,286,083 B2 | 10/2012 | Barrus et al. |
| 8,289,317 B2 | 10/2012 | Harvill |
| 8,290,769 B2 | 10/2012 | Taub et al. |
| 8,295,589 B2 | 10/2012 | Ofek et al. |
| 8,300,900 B2 | 10/2012 | Lai et al. |
| 8,303,113 B2 | 11/2012 | Esser et al. |
| 8,307,560 B2 | 11/2012 | Tulin |
| 8,330,801 B2 | 12/2012 | Wang et al. |
| 8,346,020 B2 | 1/2013 | Guntur |
| 8,355,079 B2 | 1/2013 | Zhang et al. |
| 8,372,319 B2 | 2/2013 | Liguori et al. |
| 8,374,422 B2 | 2/2013 | Roussel |
| 8,385,646 B2 | 2/2013 | Lang et al. |
| 8,391,547 B2 | 3/2013 | Huang et al. |

(56) References Cited

U.S. PATENT DOCUMENTS

| | | | |
|---|---|---|---|
| 8,459,792 B2 | 6/2013 | Wilson | |
| 8,605,942 B2 * | 12/2013 | Takeuchi | 382/103 |
| 8,605,989 B2 | 12/2013 | Rudin et al. | |
| 8,743,051 B1 | 6/2014 | Moy et al. | |
| 8,813,378 B2 | 8/2014 | Grove | |
| 2001/0023413 A1 | 9/2001 | Fukuma et al. | |
| 2001/0026272 A1 | 10/2001 | Feld et al. | |
| 2001/0051517 A1 | 12/2001 | Strietzel | |
| 2002/0010655 A1 | 1/2002 | Kjallstrom | |
| 2002/0105530 A1 | 8/2002 | Waupotitsch et al. | |
| 2002/0149585 A1 | 10/2002 | Kacyra et al. | |
| 2003/0001835 A1 | 1/2003 | Dimsdale et al. | |
| 2003/0030904 A1 | 2/2003 | Huang | |
| 2003/0071810 A1 | 4/2003 | Shoov et al. | |
| 2003/0110099 A1 | 6/2003 | Trajkovic et al. | |
| 2003/0112240 A1 | 6/2003 | Cerny | |
| 2004/0004633 A1 | 1/2004 | Perry et al. | |
| 2004/0090438 A1 | 5/2004 | Alliez et al. | |
| 2004/0217956 A1 | 11/2004 | Besl et al. | |
| 2004/0223631 A1 | 11/2004 | Waupotitsch et al. | |
| 2004/0257364 A1 | 12/2004 | Basler | |
| 2005/0053275 A1 | 3/2005 | Stokes | |
| 2005/0063582 A1 | 3/2005 | Park et al. | |
| 2005/0111705 A1 | 5/2005 | Waupotitsch et al. | |
| 2005/0128211 A1 | 6/2005 | Berger et al. | |
| 2005/0162419 A1 | 7/2005 | Kim et al. | |
| 2005/0190264 A1 | 9/2005 | Neal | |
| 2005/0208457 A1 | 9/2005 | Fink et al. | |
| 2005/0226509 A1 | 10/2005 | Maurer et al. | |
| 2006/0012748 A1 | 1/2006 | Periasamy et al. | |
| 2006/0017887 A1 | 1/2006 | Jacobson et al. | |
| 2006/0067573 A1 | 3/2006 | Parr et al. | |
| 2006/0127852 A1 | 6/2006 | Wen | |
| 2006/0161474 A1 | 7/2006 | Diamond et al. | |
| 2006/0212150 A1 | 9/2006 | Sims, Jr. | |
| 2006/0216680 A1 | 9/2006 | Buckwalter et al. | |
| 2007/0013873 A9 | 1/2007 | Jacobson et al. | |
| 2007/0104360 A1 | 5/2007 | Huang et al. | |
| 2007/0127848 A1 | 6/2007 | Kim et al. | |
| 2007/0160306 A1 | 7/2007 | Ahn et al. | |
| 2007/0183679 A1 | 8/2007 | Moroto et al. | |
| 2007/0233311 A1 | 10/2007 | Okada et al. | |
| 2007/0262988 A1 | 11/2007 | Christensen | |
| 2008/0084414 A1 | 4/2008 | Rosel et al. | |
| 2008/0112610 A1 | 5/2008 | Israelsen et al. | |
| 2008/0136814 A1 | 6/2008 | Chu et al. | |
| 2008/0152200 A1 | 6/2008 | Medioni et al. | |
| 2008/0162695 A1 | 7/2008 | Muhn et al. | |
| 2008/0163344 A1 | 7/2008 | Yang | |
| 2008/0170077 A1 | 7/2008 | Sullivan et al. | |
| 2008/0201641 A1 | 8/2008 | Xie | |
| 2008/0219589 A1 | 9/2008 | Jung et al. | |
| 2008/0240588 A1 | 10/2008 | Tsoupko-Sitnikov et al. | |
| 2008/0246759 A1 | 10/2008 | Summers | |
| 2008/0271078 A1 | 10/2008 | Gossweiler et al. | |
| 2008/0278437 A1 | 11/2008 | Barrus et al. | |
| 2008/0278633 A1 | 11/2008 | Tsoupko-Sitnikov et al. | |
| 2008/0279478 A1 | 11/2008 | Tsoupko-Sitnikov et al. | |
| 2008/0280247 A1 | 11/2008 | Sachdeva et al. | |
| 2008/0294393 A1 | 11/2008 | Laake et al. | |
| 2008/0297503 A1 | 12/2008 | Dickinson et al. | |
| 2008/0310757 A1 | 12/2008 | Wolberg et al. | |
| 2009/0010507 A1 | 1/2009 | Geng | |
| 2009/0040216 A1 | 2/2009 | Ishiyama | |
| 2009/0123037 A1 | 5/2009 | Ishida | |
| 2009/0129402 A1 | 5/2009 | Moller et al. | |
| 2009/0132371 A1 | 5/2009 | Strietzel et al. | |
| 2009/0135176 A1 | 5/2009 | Snoddy et al. | |
| 2009/0135177 A1 | 5/2009 | Strietzel et al. | |
| 2009/0144173 A1 | 6/2009 | Mo et al. | |
| 2009/0153552 A1 | 6/2009 | Fidaleo et al. | |
| 2009/0153553 A1 | 6/2009 | Kim et al. | |
| 2009/0153569 A1 | 6/2009 | Park et al. | |
| 2009/0154794 A1 | 6/2009 | Kim et al. | |
| 2009/0184960 A1 | 7/2009 | Carr et al. | |
| 2009/0185763 A1 | 7/2009 | Park et al. | |
| 2009/0219281 A1 | 9/2009 | Maillot | |
| 2009/0279784 A1 | 11/2009 | Arcas et al. | |
| 2009/0296984 A1 | 12/2009 | Nijim et al. | |
| 2009/0304270 A1 | 12/2009 | Bhagavathy et al. | |
| 2009/0310861 A1 | 12/2009 | Lang et al. | |
| 2009/0316945 A1 | 12/2009 | Akansu | |
| 2009/0316966 A1 | 12/2009 | Marshall et al. | |
| 2009/0324030 A1 | 12/2009 | Frinking et al. | |
| 2009/0324121 A1 | 12/2009 | Bhagavathy et al. | |
| 2010/0030578 A1 | 2/2010 | Siddique et al. | |
| 2010/0134487 A1 | 6/2010 | Lai et al. | |
| 2010/0138025 A1 | 6/2010 | Morton et al. | |
| 2010/0141893 A1 | 6/2010 | Altheimer et al. | |
| 2010/0145489 A1 | 6/2010 | Esser et al. | |
| 2010/0166978 A1 | 7/2010 | Nieminen | |
| 2010/0179789 A1 | 7/2010 | Sachdeva et al. | |
| 2010/0191504 A1 | 7/2010 | Esser et al. | |
| 2010/0198817 A1 | 8/2010 | Esser et al. | |
| 2010/0209005 A1 | 8/2010 | Rudin et al. | |
| 2010/0277476 A1 | 11/2010 | Johanson et al. | |
| 2010/0293192 A1 | 11/2010 | Suy et al. | |
| 2010/0293251 A1 | 11/2010 | Suy et al. | |
| 2010/0302275 A1 | 12/2010 | Saldanha et al. | |
| 2010/0329568 A1 | 12/2010 | Gamliel et al. | |
| 2011/0001791 A1 | 1/2011 | Kirshenboim et al. | |
| 2011/0025827 A1 | 2/2011 | Shpunt et al. | |
| 2011/0026606 A1 | 2/2011 | Bhagavathy et al. | |
| 2011/0026607 A1 | 2/2011 | Bhagavathy et al. | |
| 2011/0029561 A1 | 2/2011 | Slaney et al. | |
| 2011/0040539 A1 | 2/2011 | Szymczyk et al. | |
| 2011/0043540 A1 | 2/2011 | Fancher et al. | |
| 2011/0043610 A1 | 2/2011 | Ren et al. | |
| 2011/0071804 A1 | 3/2011 | Xie | |
| 2011/0075916 A1 | 3/2011 | Knothe et al. | |
| 2011/0096832 A1 | 4/2011 | Zhang et al. | |
| 2011/0102553 A1 | 5/2011 | Corcoran et al. | |
| 2011/0115786 A1 | 5/2011 | Mochizuki | |
| 2011/0148858 A1 | 6/2011 | Ni et al. | |
| 2011/0157229 A1 | 6/2011 | Ni et al. | |
| 2011/0158394 A1 | 6/2011 | Strietzel | |
| 2011/0166834 A1 | 7/2011 | Clara | |
| 2011/0188780 A1 | 8/2011 | Wang et al. | |
| 2011/0208493 A1 | 8/2011 | Altheimer et al. | |
| 2011/0211816 A1 | 9/2011 | Goedeken et al. | |
| 2011/0227923 A1 | 9/2011 | Mariani et al. | |
| 2011/0227934 A1 | 9/2011 | Sharp | |
| 2011/0229659 A1 | 9/2011 | Reynolds | |
| 2011/0229660 A1 | 9/2011 | Reynolds | |
| 2011/0234581 A1 | 9/2011 | Eikelis et al. | |
| 2011/0234591 A1 | 9/2011 | Mishra et al. | |
| 2011/0249136 A1 | 10/2011 | Levy et al. | |
| 2011/0262717 A1 | 10/2011 | Broen et al. | |
| 2011/0279634 A1 | 11/2011 | Periyannan et al. | |
| 2011/0292034 A1 | 12/2011 | Corazza et al. | |
| 2011/0293247 A1 | 12/2011 | Bhagavathy et al. | |
| 2011/0304912 A1 | 12/2011 | Broen et al. | |
| 2011/0306417 A1 | 12/2011 | Sheblak et al. | |
| 2012/0002161 A1 | 1/2012 | Altheimer et al. | |
| 2012/0008090 A1 | 1/2012 | Atheimer et al. | |
| 2012/0013608 A1 | 1/2012 | Ahn et al. | |
| 2012/0016645 A1 | 1/2012 | Altheimer et al. | |
| 2012/0021835 A1 | 1/2012 | Keller et al. | |
| 2012/0038665 A1 | 2/2012 | Strietzel | |
| 2012/0075296 A1 | 3/2012 | Wegbreit et al. | |
| 2012/0079377 A1 | 3/2012 | Goossens | |
| 2012/0082432 A1 | 4/2012 | Ackley et al. | |
| 2012/0114184 A1 | 5/2012 | Barcons-Palau et al. | |
| 2012/0114251 A1 | 5/2012 | Solem et al. | |
| 2012/0121174 A1 | 5/2012 | Bhagavathy et al. | |
| 2012/0130524 A1 | 5/2012 | Clara et al. | |
| 2012/0133640 A1 | 5/2012 | Chin et al. | |
| 2012/0133850 A1 | 5/2012 | Broen et al. | |
| 2012/0147324 A1 | 6/2012 | Marin et al. | |
| 2012/0158369 A1 | 6/2012 | Bachrach et al. | |
| 2012/0162218 A1 | 6/2012 | Kim et al. | |
| 2012/0166431 A1 | 6/2012 | Brewington et al. | |
| 2012/0170821 A1 | 7/2012 | Zug et al. | |
| 2012/0176380 A1 | 7/2012 | Wang et al. | |

(56) References Cited

U.S. PATENT DOCUMENTS

| | | |
|---|---|---|
| 2012/0177283 A1 | 7/2012 | Wang et al. |
| 2012/0183202 A1 | 7/2012 | Wei et al. |
| 2012/0183204 A1 | 7/2012 | Aarts et al. |
| 2012/0183238 A1 | 7/2012 | Savvides et al. |
| 2012/0192401 A1 | 8/2012 | Pavlovskaia et al. |
| 2012/0206610 A1 | 8/2012 | Wang et al. |
| 2012/0219195 A1 | 8/2012 | Wu et al. |
| 2012/0224629 A1 | 9/2012 | Bhagavathy et al. |
| 2012/0229758 A1 | 9/2012 | Marin et al. |
| 2012/0256906 A1 | 10/2012 | Ross et al. |
| 2012/0263437 A1 | 10/2012 | Barcons-Palau et al. |
| 2012/0288015 A1 | 11/2012 | Zhang et al. |
| 2012/0294369 A1 | 11/2012 | Bhagavathy et al. |
| 2012/0294530 A1 | 11/2012 | Bhaskaranand |
| 2012/0299914 A1 | 11/2012 | Kilpatrick et al. |
| 2012/0306874 A1 | 12/2012 | Nguyen et al. |
| 2012/0307074 A1 | 12/2012 | Bhagavathy et al. |
| 2012/0314023 A1 | 12/2012 | Barcons-Palau et al. |
| 2012/0320153 A1 | 12/2012 | Barcons-Palau et al. |
| 2012/0321128 A1 | 12/2012 | Medioni et al. |
| 2012/0323581 A1 | 12/2012 | Strietzel et al. |
| 2013/0027657 A1 | 1/2013 | Esser et al. |
| 2013/0070973 A1 | 3/2013 | Saito et al. |
| 2013/0088490 A1 | 4/2013 | Rasmussen et al. |
| 2013/0187915 A1 | 7/2013 | Lee et al. |
| 2013/0201187 A1 | 8/2013 | Tong et al. |
| 2013/0271451 A1 | 10/2013 | Tong et al. |

FOREIGN PATENT DOCUMENTS

| | | |
|---|---|---|
| EP | 0359596 A1 | 3/1990 |
| EP | 0994336 A2 | 4/2000 |
| EP | 1011006 A1 | 6/2000 |
| EP | 1136869 A1 | 9/2001 |
| EP | 1138253 A2 | 10/2001 |
| EP | 0444902 B2 | 6/2002 |
| EP | 1450201 A1 | 8/2004 |
| EP | 1728467 A1 | 12/2006 |
| EP | 1154302 B1 | 8/2009 |
| FR | 2966038 A1 | 4/2012 |
| GB | 2449855 A | 12/2008 |
| JP | 2003345857 A | 12/2003 |
| JP | 2004272530 A | 9/2004 |
| JP | 2005269022 A | 9/2005 |
| KR | 20000028583 A | 5/2000 |
| KR | 200000051217 A | 8/2000 |
| KR | 20040097200 A | 11/2004 |
| KR | 20080086945 A | 9/2008 |
| KR | 20100050052 A | 5/2010 |
| WO | WO 9300641 A1 | 1/1993 |
| WO | WO 9604596 A1 | 2/1996 |
| WO | WO 9740342 A2 | 10/1997 |
| WO | WO 9740960 A1 | 11/1997 |
| WO | WO 9813721 A1 | 4/1998 |
| WO | WO 9827861 A1 | 7/1998 |
| WO | WO 9827902 A2 | 7/1998 |
| WO | WO 9835263 A1 | 8/1998 |
| WO | WO 9852189 A2 | 11/1998 |
| WO | WO 9857270 A1 | 12/1998 |
| WO | WO 9956942 A1 | 11/1999 |
| WO | WO 9964918 A1 | 12/1999 |
| WO | WO 0000863 A1 | 1/2000 |
| WO | WO 0016683 A1 | 3/2000 |
| WO | WO 0045348 A1 | 8/2000 |
| WO | WO 0049919 A1 | 8/2000 |
| WO | WO 0062148 A1 | 10/2000 |
| WO | WO 0064168 A1 | 10/2000 |
| WO | WO 0123908 A1 | 4/2001 |
| WO | WO 0132074 A1 | 5/2001 |
| WO | WO 0135338 A1 | 5/2001 |
| WO | WO 0161447 A1 | 8/2001 |
| WO | WO 0167325 A1 | 9/2001 |
| WO | WO 0174553 A2 | 10/2001 |
| WO | WO 0178630 A1 | 10/2001 |
| WO | WO 0188654 A2 | 11/2001 |
| WO | WO 0207845 A1 | 1/2002 |
| WO | WO 0241127 A2 | 5/2002 |
| WO | WO 03079097 A1 | 9/2003 |
| WO | WO 03084448 A1 | 10/2003 |
| WO | WO 2007012261 A1 | 2/2007 |
| WO | WO 2007017751 A1 | 2/2007 |
| WO | WO 2007018017 A1 | 2/2007 |
| WO | WO 2008009355 A1 | 1/2008 |
| WO | WO 2008009423 A1 | 1/2008 |
| WO | WO 2008135178 A1 | 11/2008 |
| WO | WO 2009023012 A1 | 2/2009 |
| WO | WO 2009043941 A1 | 4/2009 |
| WO | 2010039976 A1 | 4/2010 |
| WO | 2010042990 A1 | 4/2010 |
| WO | WO 2011012743 A2 | 2/2011 |
| WO | WO 2011095917 A1 | 8/2011 |
| WO | WO 2011134611 A1 | 11/2011 |
| WO | WO 2011147649 A1 | 12/2011 |
| WO | WO 2012051654 A1 | 4/2012 |
| WO | WO 2012054972 A1 | 5/2012 |
| WO | WO 2012054983 A1 | 5/2012 |

OTHER PUBLICATIONS (Sudipta Sinha, "GPU-based Video Feature Tracking and Matching", May 2006, http://frahm.web.unc.edu/files/2014/01/GPU-based-Video-Feature-Tracking-And-Matching.pdf).*
PCT International Search Report for PCT International Patent Application No. PCT/US2013/042504, mailed Aug. 19, 2013.
PCT International Search Report for PCT International Patent Application No. PCT/US2013/042509, mailed Sep. 2, 2013.
PCT International Search Report for PCT International Patent Application No. PCT/US2013/042514, mailed Aug. 30, 2013.
PCT International Search Report for PCT International Patent Application No. PCT/US2013/042517, mailed Aug. 29, 2013.
3D Morphable Model Face Animation, http://www.youtube.com/watch?v=nice6NYb_WA, Apr. 20, 2006.
Visionix 3D iView, Human Body Measurement Newsletter, vol. 1., No. 2, Sep. 2005, pp. 2 and 3.
Blaise Aguera y Areas demos Photosynth, May 2007. Ted.com, http://www.ted.com/talks/blaise_aguera_y_arcas_demos_photosynth.html.
ERC Tecnology Leads to Eyeglass "Virtual Try-on" System, Apr. 20, 2012, http://showcase.erc-assoc.org/accomplishments/microelectronic/imsc6-eyeglass.htm.
Information about Related Patents and Patent Applications.
U.S. Appl. No. 13/775,785, filed Feb. 25, 2013, Systems and Methods for Adjusting a Virtual Try-On.
U.S. Appl. No. 13/775,764, filed Feb. 25, 2013, Systems and Methods for Feature Tracking.
U.S. Appl. No. 13/774,995, filed Feb. 22, 2013, Systems and Methods for Scaling a Three-Dimensional Model.
U.S. Appl. No. 13/774,985, filed Feb. 22, 2013, Systems and Methods for Generating a 3-D Model of a Virtual Try-On Product.
U.S. Appl. No. 13/774,983, filed Feb. 22, 2013, Systems and Methods for Generating a 3-D Model of a User for a Virtual Try-On Product.
U.S. Appl. No. 13/774,978, filed Feb. 22, 2013, Systems and Methods for Efficiently Processing Virtual 3-D Data.
U.S. Appl. No. 13/774,958, filed Feb. 22, 2013, Systems and Methods for Rendering Virtual Try-On Products.
U.S. Appl. No. 13/706,909, filed Dec. 6, 2012, Systems and Methods for Obtaining a Pupillary Distance Measurement Using a Mobile Computing Device.
PCT International Search Report for PCT International Patent Application No. PCT/US2012/068174, mailed Mar. 7, 2013.
PCT International Search Report for PCT International Patent Application No. PCT/US2013/042512, mailed Sep. 6, 2013.
PCT International Search Report for PCT International Patent Application No. PCT/US2013/042529, mailed Sep. 17, 2013.
PCT International Search Report for PCT International Patent Application No. PCT/US2013/042525, mailed Sep. 17, 2013.
PCT International Search Report for PCT International Patent Application No. PCT/US2013/042520, mailed Sep. 27, 2013.

(56) References Cited

OTHER PUBLICATIONS

Dror et al., Recognition of Surface Relfectance Properties form a Single Image under Unknown Real-World Illumination, IEEE, Proceedings of the IEEE Workshop on Identifying Objects Across Variations in Lighting: Psychophysics & Computation, Dec. 2011.
Simonite, 3-D Models Created by a Cell Phone, Mar. 23, 2011, url: http://www.technologyreview.com/news/423386/3-d-models-created-by-a-cell-phone/.

Fidaleo, Model-Assisted 3D Face Reconstruction from Video, AMFG'07 Analysis and Modeling of Faces and Gestures Lecture Notes in Computer Science vol. 4778, 2007, pp. 124-138.

Garcia-Mateos, Estimating 3D facial pose in video with just three points, CVPRW '08 Computer vision and Pattern Recognition Workshops, 2008.

* cited by examiner

SYSTEMS AND METHODS FOR FEATURE TRACKING

RELATED APPLICATIONS

This application claims priority to U.S. Provisional Application No. 61/650,983, entitled SYSTEMS AND METHODS TO VIRTUALLY TRY-ON PRODUCTS, filed on May 23, 2012; and U.S. Provisional Application No. 61/735,951, entitled SYSTEMS AND METHODS TO VIRTUALLY TRY-ON PRODUCTS, filed on Dec. 11, 2012, which is incorporated herein in its entirety by this reference.

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computers have opened up an entire industry of internet shopping. In many ways, online shopping has changed the way consumers purchase products. For example, a consumer may want to know what they will look like in and/or with a product. On the webpage of a certain product, a photograph of a model with the particular product may be shown. However, users may want to see more accurate depictions of themselves in relation to various products.

SUMMARY

According to at least one embodiment, a computer-implemented method for processing, by a graphical processor unit (GPU), a plurality of images of a user. A plurality of features detected by the GPU in a first image of the plurality of images of the user may be selected. Each selected feature may include one or more pixels. In a second image of the plurality of images of the user, a search may be performed for the plurality of features selected in the first image. A variance may be calculated, on the GPU, for each selected feature found in the second image. The variance may indicate a degree to which a portion of the second image varies from a corresponding portion of the first image. The calculated variance may be stored in a variance file.

In one embodiment, one or more patches may be selected from among the selected features in the first image based on the calculated variance of each selected feature. Each patch may include a square area of pixels centered on one of the selected features of the first image. In some configurations, upon selecting the one or more patches in the first image, the first image may be removed from memory. In some embodiments, the one or more patches may be selected based on a predetermined threshold of calculated variance. In one embodiment, the one or more patches may be selected based on a predetermined number of patches. In some configurations, each variance may be divided into first and second elements. The first element may be stored in a first file and the second element may be stored in a second file.

In one embodiment, a cross-correlation algorithm may be performed on a GPU to determine how a first patch, selected among the one or more patches, is positioned in first and second sample images of the plurality of images of the user. In some embodiments, performing the cross-correlation algorithm on the GPU may include determining a pose of the user in the first and second sample images, performing a fast Fourier transform (FFT) on the first patch, and performing the FFT on the first and second sample images. The first sample image may be placed in the real element of a complex number and the second sample image may be placed in the imaginary element of the complex number. The FFT of the first patch may be stored in a third file. In some configurations, performing the cross-correlation algorithm on the GPU may include multiplying element-wise the FFT of the first patch by the FFT of the first and second sample images, calculating an inverse FFT of the multiplied FFTs, resulting in a first score for the first sample image and a second score for the second sample image, and normalizing the result of the cross-correlation by dividing both first and second scores by the calculated variance stored in the variance file.

In one embodiment, the cross-correlation of each selected patch may be performed on the GPU simultaneously. In some configurations, on the GPU, a second cross-correlation algorithm may be performed on third and fourth sample images of the plurality of images of the user using the FFT of the first patch stored in the third file to determine how the first patch is positioned in the third and fourth sample images. In some embodiments, a position of the selected feature of the first patch may be determined as a point in a virtual three-dimensional (3-D) space.

A computing device configured to process, by a graphical processor unit (GPU), a plurality of images of a user is also described. The device may include a processor and memory in electronic communication with the processor. The memory may store instructions that are executable by the GPU to select a plurality of features detected by the GPU in a first image of the plurality of images of the user. Each selected feature may include one or more pixels. In one embodiment, the instructions may be executable by the GPU to search, in a second image of the plurality of images of the user, for the plurality of features selected in the first image. In some configurations, the instructions may be executable by the GPU to calculate variance, on the GPU, for each selected feature found in the second image. The variance may indicate a degree to which a portion of the second image varies from a corresponding portion of the first image. In one embodiment, the instructions may be executable by the GPU to store the calculated variance in a variance file.

A computer-program product to process, by a graphical processor unit (GPU), a plurality of images of a user is also described. The computer-program product may include a non-transitory computer-readable medium that stores instructions. The instructions may be executable by the GPU to select a plurality of features detected by the GPU in a first image of the plurality of images of the user. Each selected feature may include one or more pixels. In one embodiment, the instructions may be executable by the GPU to search, in a second image of the plurality of images of the user, for the plurality of features selected in the first image. In some configurations, the instructions may be executable by the GPU to calculate variance, on the GPU, for each selected feature found in the second image. The variance may indicate a degree to which a portion of the second image varies from a corresponding portion of the first image. In one embodiment, the instructions may be executable by the GPU to store the calculated variance in a variance file.

According to at least one embodiment, a computer-implemented method for processing, by a graphical processor unit (GPU), a plurality of images of a user. A plurality of features detected by the GPU in a first image of the plurality of images of the user may be selected. Each selected feature may include one or more pixels. In a second image of the plurality of images of the user, a search may be performed for the plurality of features selected in the first image. A variance may be calculated, on the GPU, for each selected feature found in the second image. The variance may indicate a degree to which a portion of the second image varies from a corresponding portion of the first image. The calculated variance may be stored in a variance file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
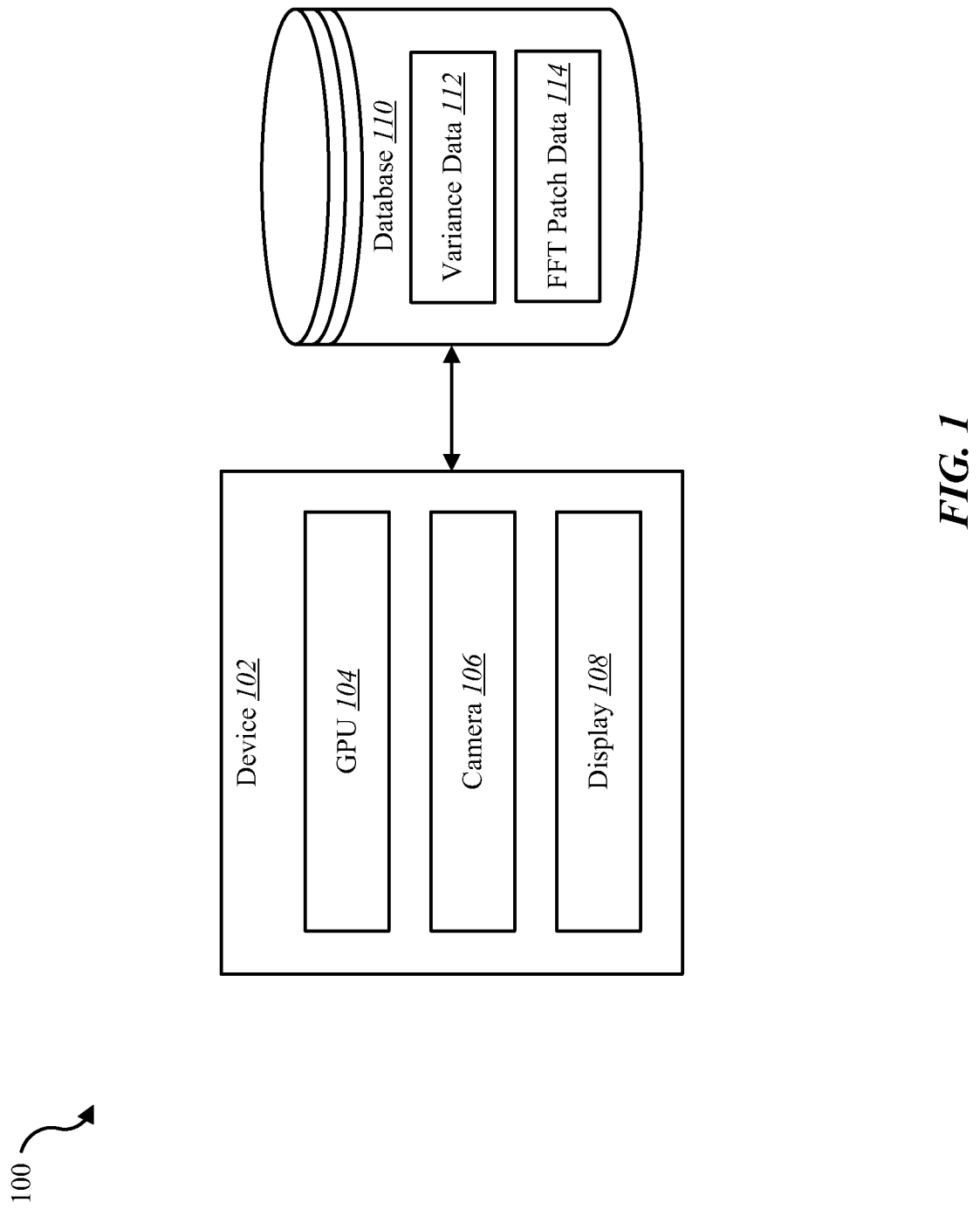
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to processing, by a graphical processor unit (GPU), a plurality of images of a user. Specifically, the systems and methods described herein relate to feature detection and normalized cross-correlation (i.e., template matching) of a set of images. Feature detection may include performing a "computer vision algorithm" to detect an "interesting" part of an image. Features may be used as a starting point in a computer vision algorithm. A desirable property of a feature detector may be repeatability, i.e., whether the same feature may be detected in one or more different images of the same scene. Typically, when working with feature detection and template matching of images, the image data may be copied from the GPU to the central processing unit (CPU), back to the GPU, and so forth. Copying image data back and forth between the GPU and CPU causes a bottleneck on the CPU, wasting valuable resources and computing cycles. On the CPU, feature detection of each image, as well as the cross-correlation of each interest point (i.e., corners, blobs, and/or points used in image analysis to detect distinguishable features of an image) on an image, may be performed one at a time, one after the other. However, because the results of one cross correlation do not depend on the results from another, feature detection and cross-correlation may be performed on the GPU simultaneously. Using a GPU instead of the CPU, the fast Fourier transform (FFT), element-wise multiplication, inverse FFT, and normalization may be performed simultaneously, all in parallel, for every interest point of a given image.

Additionally, in a typical implementation, the variance (degree of variation between pixels of two or more images) may not be calculated because of the computing costs involved calculating variance on the CPU. However, calculating variance on a GPU may be relatively fast compared to the CPU, and the results of the variance may be stored and used later in cross-correlation. However, rounding errors in the cross-correlation may be most affected when the variance of an interest point, or an extracted patch of the interest point, is low. Thus, in a GPU implementation, the most "trackable" features in an image may be those that have the highest variance.

FIG. 1 is a block diagram illustrating one embodiment of an environment 100 in which the present systems and methods may be implemented. In some embodiments, the systems and methods described herein may be performed on a single device (e.g., device 102). For example, a GPU 104 may be located on the device 102. Examples of devices 102 include mobile devices, smart phones, tablet computing devices, personal computing devices, computers, servers, etc.

In some configurations, a device 102 may include a GPU 104, a camera 106, and a display 108. In one example, the device 102 may be coupled to a database 110. In one embodiment, the database 110 may be internal to the device 102. In another embodiment, the database 110 may be external to the device 102. In some configurations, the database 110 may include variance data 112 and FFT patch data 114.

In one embodiment, the GPU 104 may enable feature detection and normalized cross-correlation to be performed in efficient, parallel operations. In some configurations, the GPU 104 may obtain multiple images of the user. For example, the GPU 104 may capture multiple images of a user via the camera 106. For instance, the GPU 104 may capture a video (e.g., a 5 second video) via the camera 106. In some configurations, the GPU 104 may use variance data 112 and FFT patch data 114 in relation to feature detection, cross-correlation, and 3-D modeling of a user. For example, the GPU may detect a degree of variation between a feature, or interest point, detected in a first image, and the same feature detected in a second image. The GPU 104 may store the detected variance in the variance data 112. In some configurations, the GPU 104 may generate a patch of an interest point. A patch may be a square set of pixels (e.g., 10 px by 10 px square of pixels) centered on the interest point. In some embodiments, the GPU 104 may perform an FFT algorithm on the patch. The GPU 104 may store the FFT of the patch in the FFT patch data 114. The GPU 104 may use, and reuse, the stored variance and FFT of the patch in relation to performing feature detection and feature tracking cross-correlation of one or more images.

Figure 2:
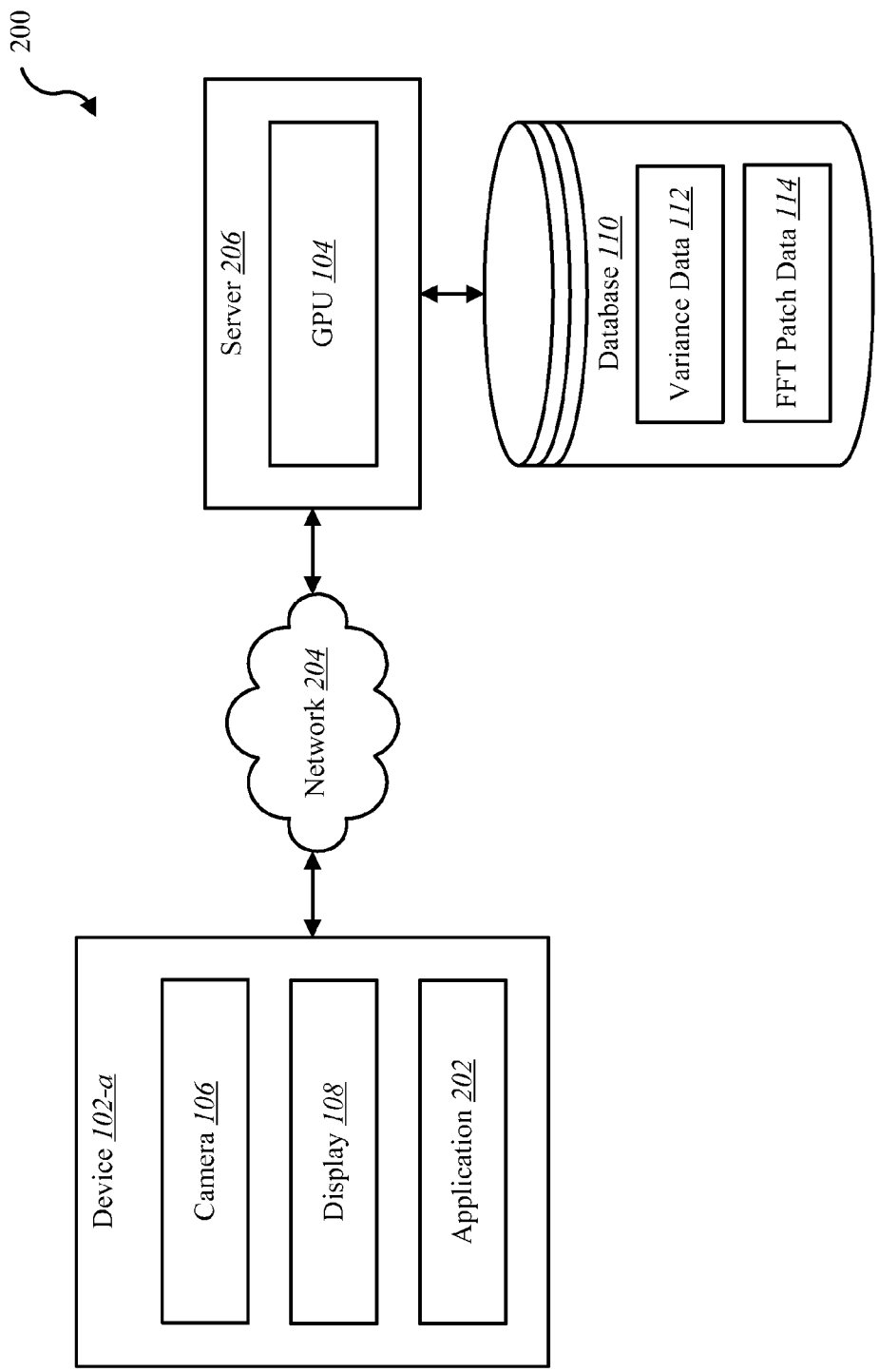
FIG. 2 is a block diagram illustrating another embodiment of an environment in which the present systems and methods may be implemented.

FIG. 2 is a block diagram illustrating another embodiment of an environment 200 in which the present systems and methods may be implemented. In some embodiments, a device 102-*a* may communicate with a server 206 via a network 204. Example of networks 204 include, local area networks (LAN), wide area networks (WAN), virtual private networks (VPN), wireless networks (using 802.11, for example), cellular networks (using 3G and/or LTE, for example), etc. In some configurations, the network 204 may include the internet. In some configurations, the device 102-*a* may be one example of the device 102 illustrated in FIG. 1. For example, the device 102-*a* may include the camera 106, the display 108, and an application 202. It is noted that in some embodiments, the device 102-*a* may not include a GPU 104. In some embodiments, both a device 102-*a* and a server 206 may include a GPU 104 where at least a portion of the functions of the GPU 104 are performed separately and/or concurrently on both the device 102-*a* and the server 206.

In some embodiments, the server 206 may include the GPU 104 and may be coupled to the database 110. For example, the GPU 104 may access the variance data 112 and the FFT patch data 114 in the database 110 via the server 206. The database 110 may be internal or external to the server 206. In some embodiments, the database 110 may be accessible by the device 102-*a* and/or the server 206 over the network 204.

In some configurations, the application 202 may capture multiple images via the camera 106. For example, the application 202 may use the camera 106 to capture a video. Upon capturing the multiple images, the application 202 may process the multiple images to generate image data. In some embodiments, the application 202 may transmit one or more images to the server 206. Additionally or alternatively, the application 202 may transmit to the server 206 the image data or at least one file associated with the image data.

In some configurations, the GPU 104 may process multiple images of a user to detect features in an image, track the same features among multiple images, and determine a point in a virtual 3-D space corresponding to the tracked features. In some embodiments, the application 202 may process one or more image captured by the camera 106 in order to generate a 3-D model of a user.

Figure 3:
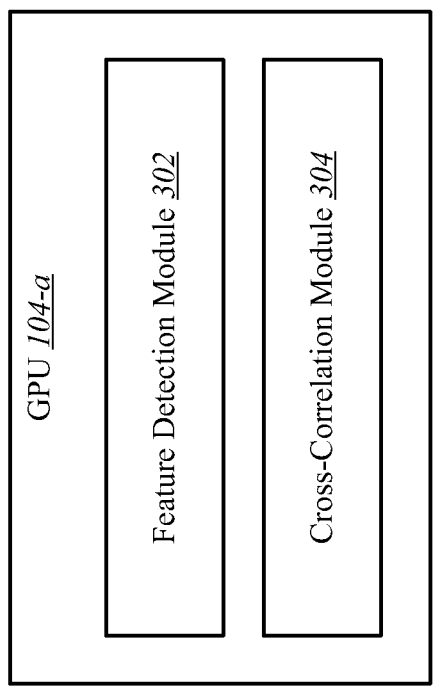
FIG. 3 is a block diagram illustrating one example of a graphical processor unit (GPU)

FIG. 3 is a block diagram illustrating one example of a GPU 104-*a*. The GPU 104-*a* may be one example of the GPU 104 depicted in FIGS. 1 and/or 2. As depicted, the GPU 104-*a* may include a feature detection module 302 and a cross-correlation module 304.

In some configurations, the feature detection module 302 may examine a pixel of an image to determine whether the pixel includes a feature of interest. In some embodiments, the feature detection module 302 detects a face and/or head of a user in an image. In some embodiments, the feature detection module 302 detects features of the user's head and/or face. In some embodiments, the feature detection module 302 may detect an edge, corner, interest point, blob, and/or ridge in an image of a user. An edge may be points of an image where there is a boundary (or an edge) between two image regions, or a set of points in the image which have a relatively strong gradient magnitude. Corners and interest points may be used interchangeably. An interest point may refer to a point-like feature in an image, which has a local two dimensional structure. In some embodiments, the feature detection module 302 may search for relatively high levels of curvature in an image gradient to detect an interest point and/or corner (e.g., corner of an eye, corner of a mouth). Thus, the feature detection module 302 may detect in an image of a user's face the corners of the eyes, eye centers, pupils, eye brows, point of the nose, nostrils, corners of the mouth, lips, center of the mouth, chin, ears, forehead, cheeks, and the like. A blob may include a complementary description of image structures in terms of regions, as opposed to corners that may be point-like in comparison. Thus, in some embodiments, the feature detection module 302 may detect a smooth, non-point-like area (i.e., blob) in an image. Additionally, or alternatively, in some embodiments, the feature detection module 302 may detect a ridge of points in the image. In some embodiments, the feature detection module 302 may extract a local image patch around a detected feature in order to track the feature in other images.

In some embodiments, the cross-correlation module 304 may process a feature detected by the feature detection module 302. The cross-correlation module 304 may track a feature detected by the feature detection module 302 and determine a position of a point in a virtual 3-D space corresponding to the tracked feature. Operations of the respective feature detection and cross-correlation modules 302 and 304 are discussed in further detail below.

Figure 4:
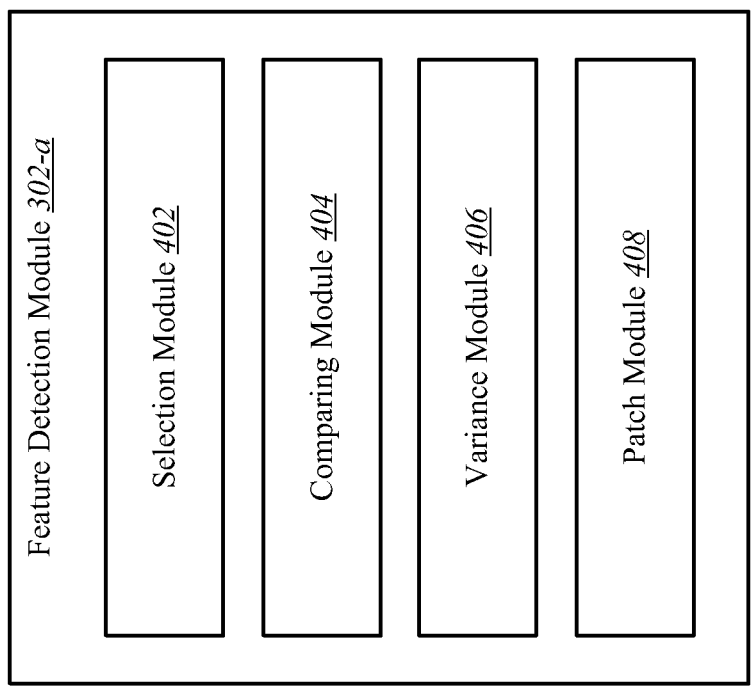
FIG. 4 is a block diagram illustrating one example of a feature detection module.

FIG. 4 is a block diagram illustrating one example of a feature detection module 302-*a*. The feature detection module 302-*a* may be one example of the feature detection module 302 illustrated in FIG. 3. As depicted, the feature detection module 302 may include a selection module 402, a comparing module 404, a variance module 406, and a patch module 408.

In one embodiment, the selection module 402 may select a feature detected by the GPU 104 in a first image. The first image may be one of multiple images. The multiple images may include images of a user. Each detected feature may include one or more pixels. For example, the detected features may include edges, interest points, corners, blobs, ridges, and/or any other visual or pixel feature contained in an image (e.g., corners of the eyes, eye centers, point of the nose, corners of the mouth, etc.). In some configurations, the comparing module 404 may search a second image of the plurality of images of the user to find a match for the feature detected in the first image. For example, upon detecting the corner of a user's eye, the selection module 402 may select the detected corner of the user's eye as a feature to be tracked in subsequent images. The comparing module 404 may compare the detected corner of the user's eye in image 1 to the corresponding detected corner of the user's eye in image 2.

In some embodiments, the variance module 406 may calculate a variance for each selected feature found in the second image. The variance may indicate a degree a portion of the second image varies from a corresponding portion of the first image. For example, upon comparing the detected corner of the user's eye in image 1 to the corresponding detected corner of the user's eye in image 2, the variance module 406 may determine the degree of variation between the corner of the user's eye in image 2 and the corner of the user's eye in image 1. In some embodiments, the variance module 406 may write the calculated variance to a file and store the file in a storage medium. In some embodiments, the variance module 406 may store the variance in the variance data 112.

In some configurations, the variance module 406 may divide a calculated variance into first and second elements. The variance module 406 may store the first element in a first file and the second element in a second file within the variance data 112. In some embodiments, the variance module 406 divides the calculated variance based on a low order element of the variance and a high order element of the variance. For example, if the variance were calculated to be a decimal number equal to 123,456, then the variance module 406 may divide the hundreds element (i.e., low order element) from the thousands element (i.e., high order element). Storing the calculated variance as 3-digit decimal numbers, the variance module 406 may store the thousands element "123" in a first high order element file in the variance data 112, and may store the hundreds element "456" in a low order element file in the variance data 112. In some embodiments, the GPU 102 and the elements of the GPU 102 may access the high and low order element files stored in the variance data 112 in order to implement the calculated variance in one or more processes related to feature detection, detection tracking, cross-correlation, and generation of a 3-D model.

In one embodiment, the patch module 408 may select, or extract, from among the selected features in the first image one or more patches based on the calculated variance of each selected feature. Each extracted patch may include a square area of pixels centered on one of the selected features, or interest points, of the first image. Upon selecting and extracting the one or more patches in the first image, in some embodiments, the patch module 408 may remove the first image from memory. In some configurations, the patch module 408 may select and extract the one or more patches based on a predetermined threshold of calculated variance. Because a relatively low variance may cause a rounding error in the normalization of a cross-correlation process, in some embodiments, the patch module 408 may extract only those patches where the associated variance is above a certain level of variance. In some embodiments, the patch module 408 may select the one or more patches based on a predetermined number of patches.

Figure 5:
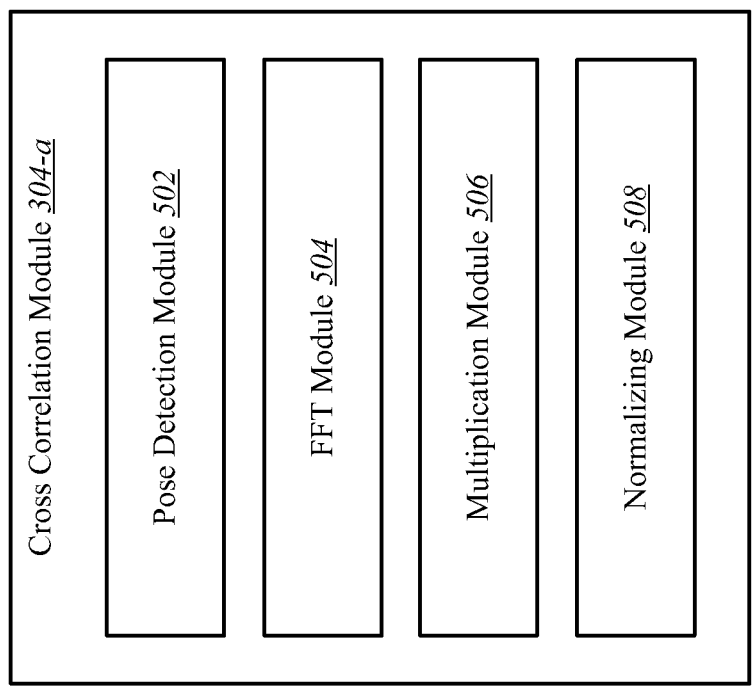
FIG. 5 is a block diagram illustrating one example of a cross correlation module.

FIG. 5 is a block diagram illustrating one example of a cross correlation module 304-a. The cross-correlation module 304-a may be one example of the cross-correlation module 304 illustrated in FIG. 3. As depicted, the cross-correlation module 304-a may include a pose detection module 502, a FFT module 504, a multiplication module 506, and a normalizing module 508.

In some configurations, the cross-correlation module 304-a may perform a cross-correlation algorithm to determine how a patch, selected among the one or more patches, is positioned in first and second sample images of the plurality of images of the user. In some embodiments, the cross-correlation module 304-a may determine a position of the selected feature of the first patch as a point in a virtual three-dimensional (3-D) space. In some configurations, as part of the process to perform the cross-correlation algorithm, the pose detection module 502 may determine a pose of the user in the first and second sample images. The FFT module 504 may perform a FFT on the first patch. In some embodiments, the FFT of the first patch may be written to a file and stored in the FFT patch data 114.

In some embodiments, the FFT module 504 may perform a FFT on the first and second sample images. The FFT module 504 may place the first sample image in a real element of a complex number (e.g., "a" in (a+bi)), and may place the second sample image in an imaginary element of the complex number (e.g., "b" in (a+bi)). In some configurations, the multiplication module 506 may multiply element-wise the FFT of the first patch by the FFT of the first and second sample images. The FFT module 504 may calculate an inverse FFT of the multiplied FFTs, resulting in a first score for the first sample image and a second score for the second sample image. In some embodiments, the normalization module 508 may normalize the result of the cross-correlation by dividing both first and second scores by the calculated variance stored in the variance file. For example, the normalization module 508 may access the high and low order element files stored in the variance data 112 to divide the first and second scores by the calculated variance.

In some embodiments, the cross correlation module 304-a may perform the cross-correlation of every selected patch of a given image simultaneously. For example, the patch module 408 may extract 32 patches from image 1. The 32 patches may be cross-correlated simultaneously with image 2 and image 3 by placing image 2 and 3 in the elements of a complex number, performing the FFT of each patch, and normalizing the result by the stored variance. The FFTs of each patch may be stored by the patch module 408 in the FFT patch data 114 for subsequent cross-correlation operations. In some embodiments, the cross-correlation module 304-a may perform a second cross-correlation algorithm on images 4 and 5 using the same FFT patches stored in the FFT patch data 114.

Figure 6:
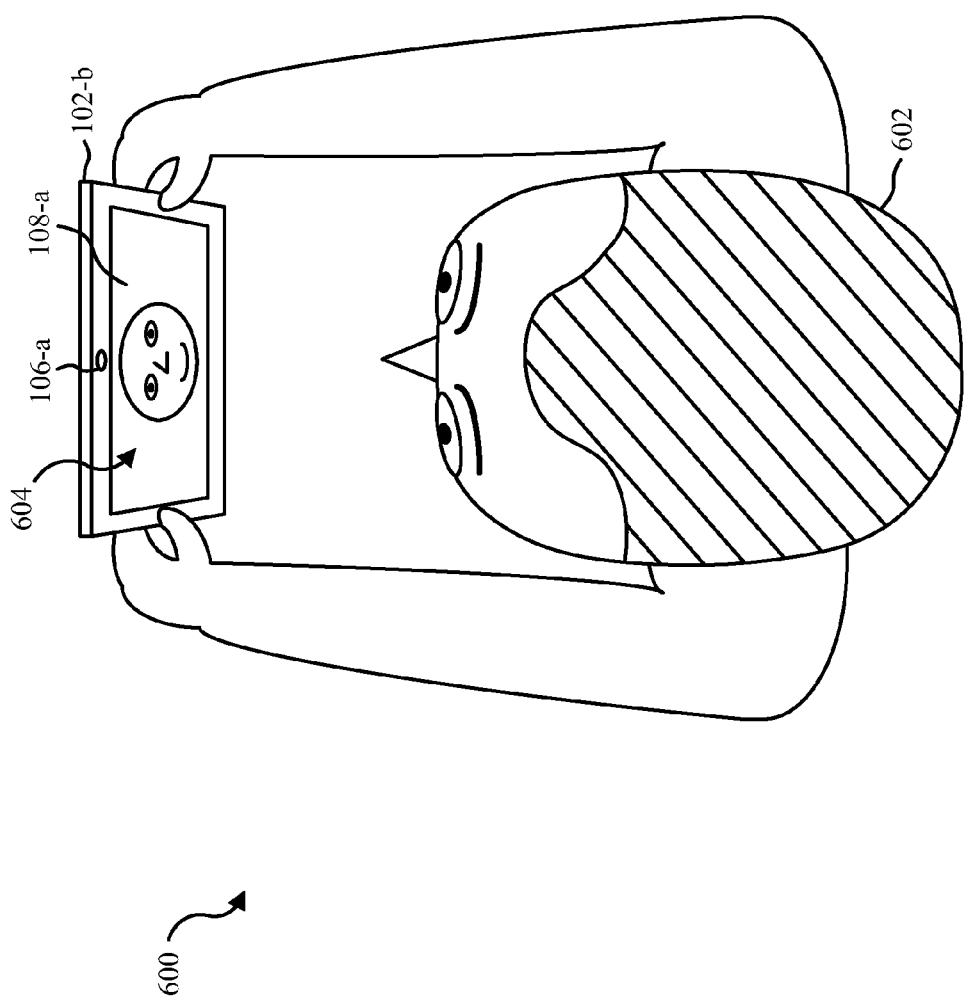
FIG. 6 is a diagram illustrating an example of a device for capturing an image of a user.

FIG. 6 is a diagram 600 illustrating an example of a device 102-b for capturing an image 604 of a user 602. The device 102-b may be one example of the device 102 illustrated in FIGS. 1 and/or 2. As depicted, the device 102-b may include a camera 106-b, and display 108-b. The camera 106-b and display 108-b may be examples of the respective camera 106 and display 108 illustrated in FIGS. 1 and/or 2.

In one embodiment, the user may operate the device 102-b. For example, the application 202 may allow the user to interact with and/or operate the device 102-b. In one embodiment, the camera 106-a may allow the user to capture an image 604 of the user 602. The GPU 104 may perform feature detection and feature tracking in relation to the images of the user captured by the device 102-b. Additionally, or alternatively, the GPU 104 may perform a normalized cross-correlation algorithm on one or more of the images of the user to track one or more features detected in each image. The GPU 104 may determine a position of the selected feature as one or more points in a virtual three-dimensional (3-D) space to enable the generation of a 3-D model of the user.

Figure 7:
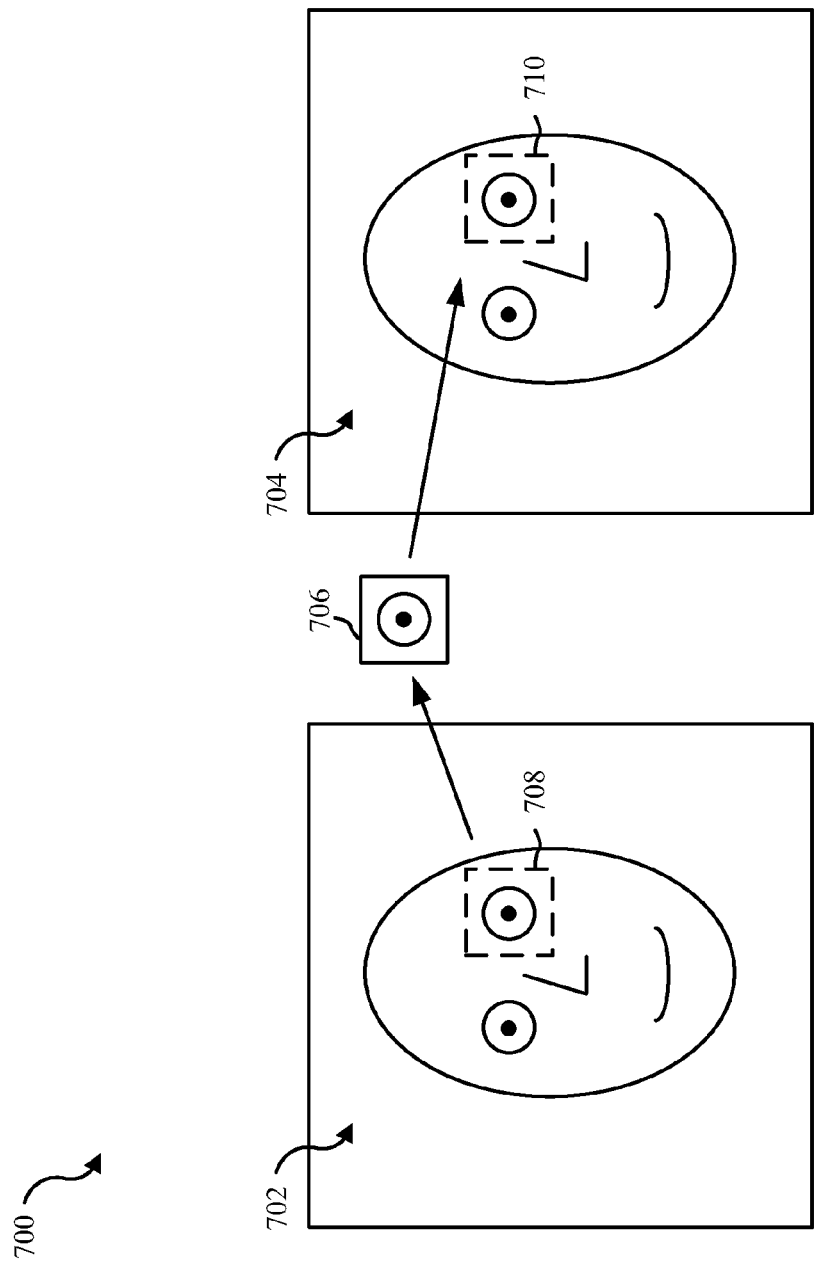
FIG. 7 illustrates an example arrangement of features detected in the depicted images of a user.

FIG. 7 illustrates an example arrangement 700 of a feature 706 detected in the depicted images 702 and 704. As depicted, the example arrangement 700 may include a first image of the user 702 and a second image of the user 704. In some embodiments, the feature detection module 302 may detect a feature 708 on the first image of the user 702 (e.g., an eye of the user). The selection module 402 may select the feature 708. The patch module 408 may extract the selected feature 708 as a patch 706. Upon extracting the patch 706, in some embodiments, the patch module 408 may remove the image 702 from memory. The comparing module 404 may compare the patch 706 to the second image of the user 704. Upon finding a match between the patch 706 and the detected feature 710 of the of the second image 704, the variance module 406 may measure the degree of variation between the patch 706 and the detected feature 710. For example, the variation module 406 may detect that the detected feature 710 has shifted in one or more directions and/or changed shape (e.g., change in the shape of the eye due to rotation of the face) in relation to the patch 706. In some embodiments, the variance module 406 may store the variance in the variance data 112. The stored variance may be used to normalize a cross-correlation of the patch 706 with one or more images. In some embodiments, the FFT module 504 may take the FFT of the patch 706 and store the FFT of the patch 706 in the FFT patch data 114. In some embodiments, the cross-correlation module 304 may use the stored FFT of the patch 706 in the performance of multiple cross-correlation algorithms.

Figure 8:
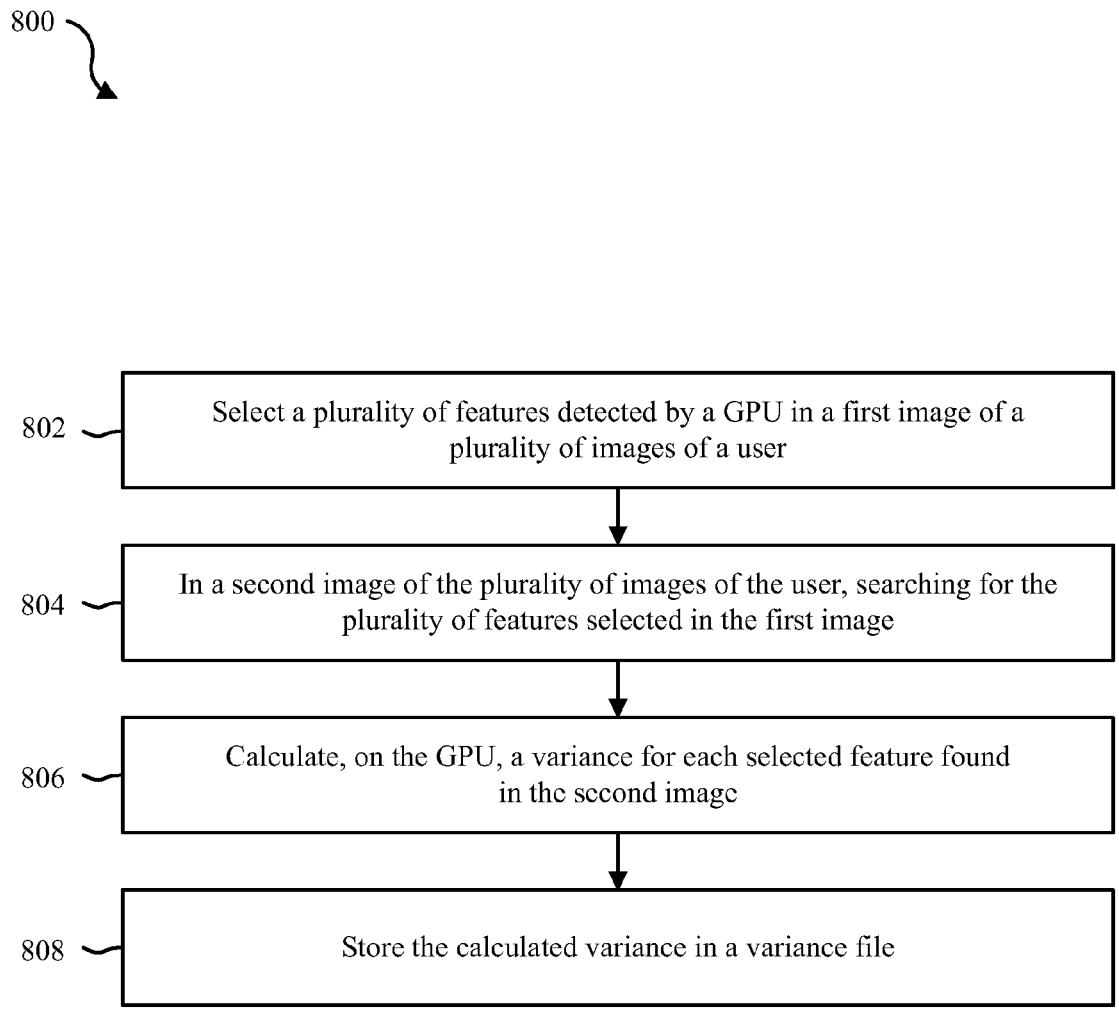
FIG. 8 is a flow diagram illustrating one embodiment of a method for detecting features in images.

FIG. 8 is a flow diagram illustrating one embodiment of a method 800 for detecting features in images. In some configurations, the method 800 may be implemented by the GPU 104 illustrated in FIGS. 1, 2, and/or 3. In some configurations, the method 800 may be implemented by the application 202 illustrated in FIG. 2.

At block 802, a plurality of features detected by the GPU in a first image of the plurality of images of the user may be selected. Each selected feature may include one or more pixels. At block 804, in a second image of the plurality of images of the user, a search may be performed for the plurality of features selected in the first image.

At block 806, a variance may be calculated, on the GPU, for each selected feature found in the second image. At block 808, the variance may indicate a degree to which a portion of the second image varies from a corresponding portion of the first image. The calculated variance may be stored in a variance file.

Figure 9:
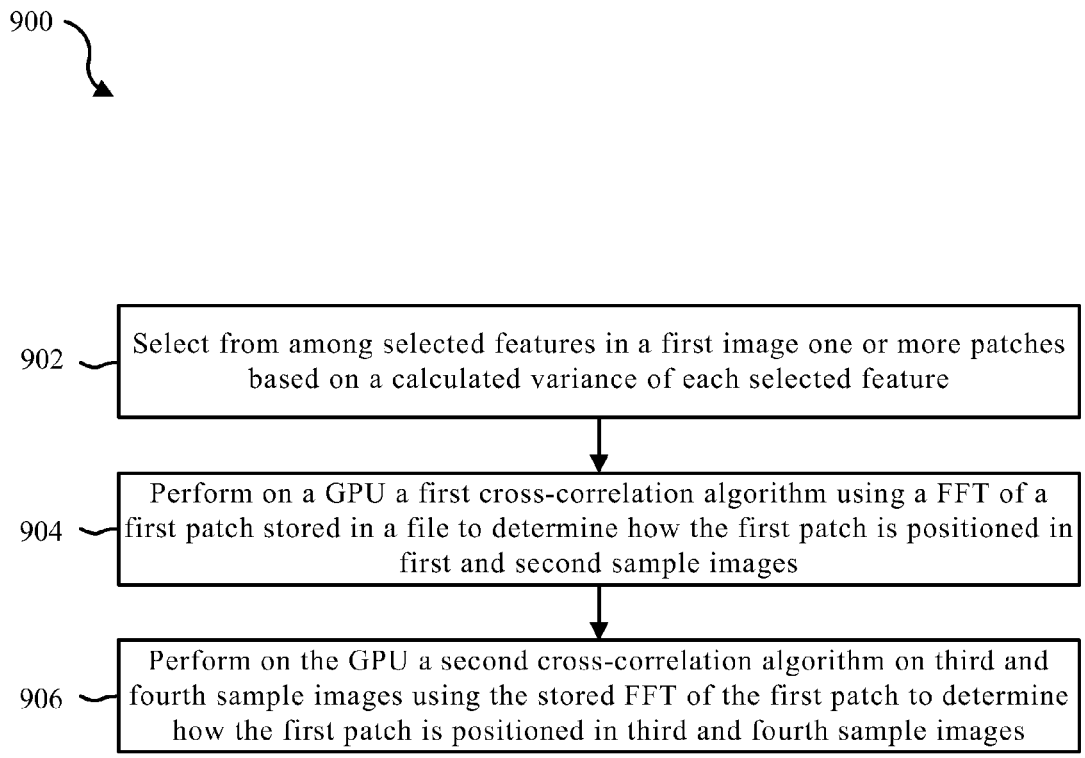
FIG. 9 is a flow diagram illustrating one embodiment of a method for performing cross-correlation algorithms on a GPU.

FIG. 9 is a flow diagram illustrating one embodiment of a method 900 for performing cross-correlation algorithms on a GPU. In some configurations, the method 900 may be implemented by the GPU 104 illustrated in FIGS. 1, 2, and/or 3. In some configurations, the method 900 may be implemented by the application 202 illustrated in FIG. 2.

At block 902, one or more patches may be selected from among selected features in a first image based on a calculated variance of each selected feature. At block 904, a first cross-correlation algorithm may be performed on a GPU using a FFT of a first patch stored in a file to determine how the first patch is positioned in first and second sample images. At block 906, a second cross-correlation algorithm may be performed on the GPU on third and fourth sample images using the FFT of the first patch stored in the file to determine how the first patch is positioned in third and fourth sample images.

Figure 10:
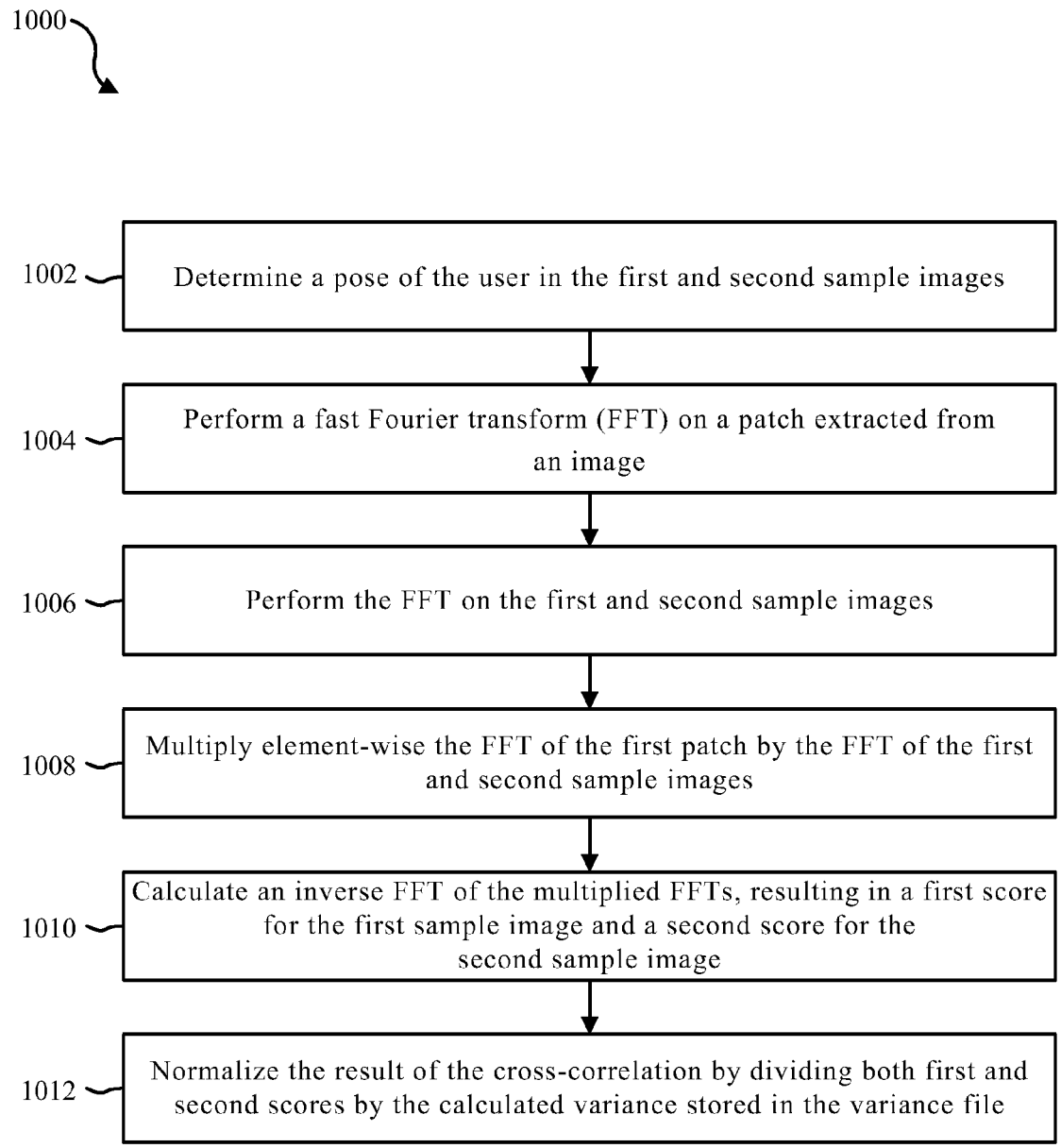
FIG. 10 is a flow diagram illustrating one embodiment of a method for performing a cross-correlation algorithm on two images simultaneously.

FIG. 10 is a flow diagram illustrating one embodiment of a method 1000 for performing a cross-correlation algorithm on two images simultaneously. In some configurations, the method 1000 may be implemented by the GPU 104 illustrated in FIGS. 1, 2, and/or 3. In some configurations, the method 1000 may be implemented by the application 202 illustrated in FIG. 2.

At block 1002, a pose of the user in the first and second sample images may be determined. At block 1004, a FFT may be performed on a patch extracted from an image. At block 1006, a FFT may be performed on the first and second sample images. The first sample image may be placed in a real element of a complex number and the second sample image may be placed in an imaginary element of the complex number.

At block 1008, the FFT of the first patch may be multiplied element-wise by the FFT of the first and second sample images. At block 1010, an inverse FFT of the multiplied FFTs may be calculated, resulting in a first score for the first sample image and a second score for the second sample image. At block 1012, the result of the cross-correlation may be normalized by dividing both first and second scores by the calculated variance stored in the variance file.

Figure 11:
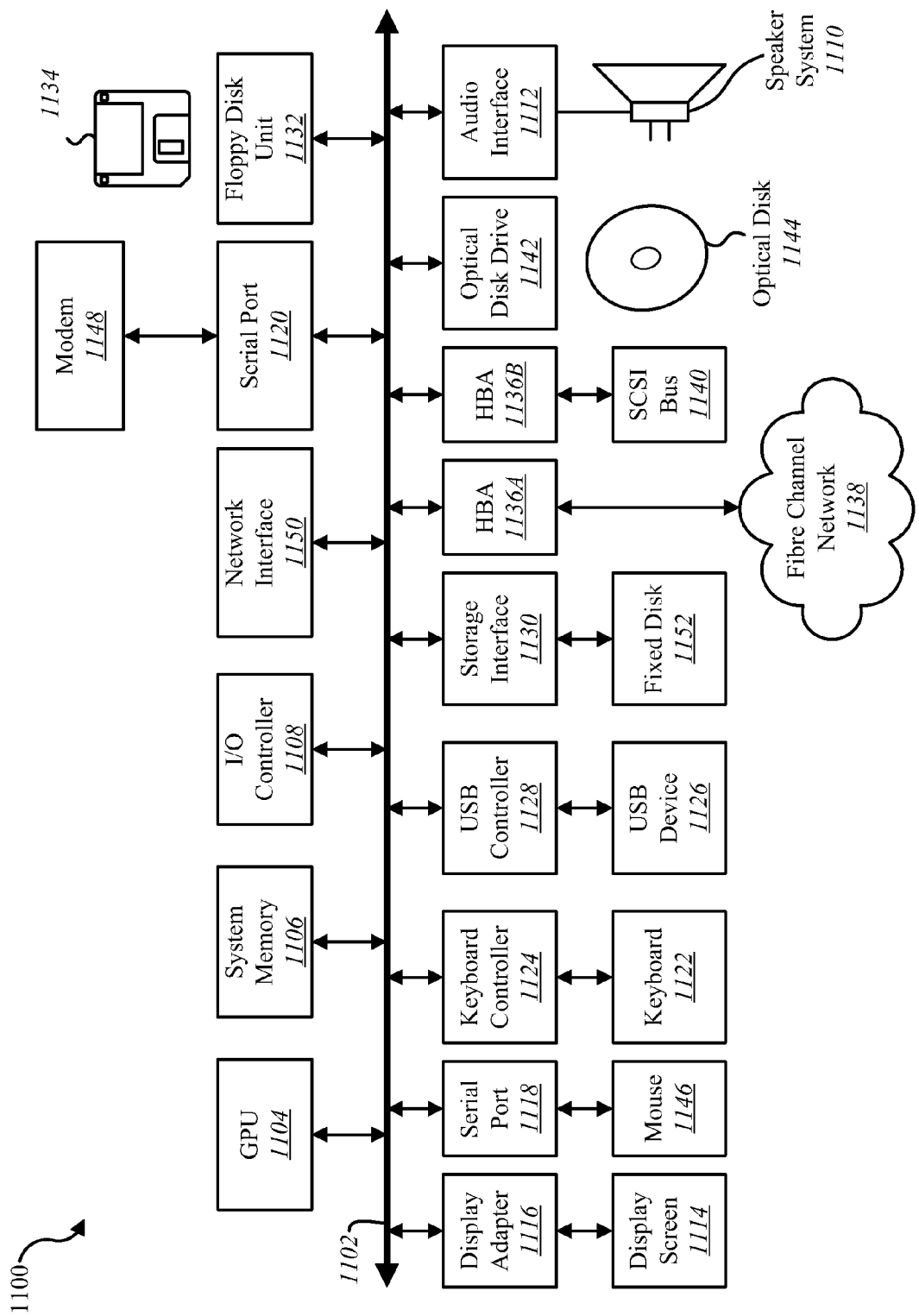
FIG. 11 depicts a block diagram of a computer system suitable for implementing the present systems and methods.

FIG. 11 depicts a block diagram of a computer system 1100 suitable for implementing the present systems and methods. The depicted computer system 1100 may be one example of a server 206 depicted in FIG. 2. Alternatively, the system 1100 may be one example of a device 102 depicted in FIGS. 1, 2, and/or 6. Computer system 1100 includes a bus 1102 which interconnects major subsystems of computer system 1100, such as a GPU 1104, a system memory 1106 (typically RAM, but which may also include ROM, flash RAM, or the like), an input/output controller 1108, an external audio device, such as a speaker system 1110 via an audio output interface 1112, an external device, such as a display screen 1114 via display adapter 1116, serial ports 1118 and mouse 1146, a keyboard 1122 (interfaced with a keyboard controller 1124), multiple USB devices 1126 (interfaced with a USB controller 1128), a storage interface 1130, a host bus adapter (HBA) interface card 1136A operative to connect with a Fibre Channel network 1138, a host bus adapter (HBA) interface card 1136B operative to connect to a SCSI bus 1140, and an optical disk drive 1142 operative to receive an optical disk 1144. The GPU 1104 may be one example of the GPU 104 depicted in FIGS. 1, 2, and/or 3. Also included are a mouse 1146 (or other point-and-click device, coupled to bus 1102 via serial port 1118), a modem 1148 (coupled to bus 1102 via serial port 1120), and a network interface 1150 (coupled directly to bus 1102).

Bus 1102 allows data communication between GPU 1104 and system memory 1106, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, one or more instructions related to the operations of the GPU 1104 to implement the present systems and methods may be stored within the system memory 1106. Applications resident with computer system 1100 are generally stored on and accessed via a non-transitory computer readable medium, such as a hard disk drive (e.g., fixed disk 1152), an optical drive (e.g., optical drive 1142), or other storage medium. Additionally, applications can be in the form of electronic signals modulated in accordance with the application and data communication technology when accessed via network modem 1148 or interface 1150.

Storage interface 1130, as with the other storage interfaces of computer system 1100, can connect to a standard computer readable medium for storage and/or retrieval of information, such as a fixed disk drive 1152. Fixed disk drive 1152 may be a part of computer system 1100 or may be separate and accessed through other interface systems. Modem 1148 may provide a direct connection to a remote server via a telephone link or to the Internet via an internet service provider (ISP). Network interface 1150 may provide a direct connection to a remote server via a direct network link to the Internet via a POP (point of presence). Network interface 1150 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the present systems and methods. The devices and subsystems can be interconnected in different ways from that shown in FIG. 11. The operation of at least some of the computer system 1100 such as that shown in FIG. 11 is readily known in the art and is not discussed in detail in this application. Code to implement the present disclosure can be stored in a non-transitory computer-readable medium such as one or more of system memory 1106, fixed disk 1152, or optical disk 1144. The operating system provided on computer system 1100 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for processing, by a graphical processor unit (GPU), a plurality of images of a user, the method comprising:
    selecting, via a device with a central processing unit (CPU) and the GPU, a plurality of features detected by the GPU in a first image of the plurality of images of the user, wherein each feature comprises one or more pixels;
    in a second image of the plurality of images of the user, searching for the plurality of features selected in the first image;
    calculating, on the GPU, a variance for each selected feature found in the second image, wherein the variance indicates a degree a portion of the second image varies from a corresponding portion of the first image;
    storing the calculated variance in a variance file; and
    performing on the GPU a cross-correlation algorithm, wherein performing the cross-correlation algorithm on the GPU comprises:
        performing, via the GPU, a fast Fourier transform (FFT) on first and second images from the plurality of images of the user.

2. The method of claim 1, further comprising:
    selecting from among the selected features in the first image one or more patches based on the calculated variance of each selected feature, wherein each patch comprises a square area of pixels centered on one of the selected features of the first image.

3. The method of claim 2, further comprising:
    upon selecting the one or more patches in the first image, removing the first image from memory.

4. The method of claim 2, wherein selecting the one or more patches further comprises:
    selecting the one or more patches based on a predetermined threshold of calculated variance.

5. The method of claim 2, wherein selecting the one or more patches further comprises:
    selecting the one or more patches based on a predetermined number of patches.

6. The method of claim 1, further comprising:
    dividing each variance into first and second elements; and
    storing the first element in a first file and the second element in a second file.

7. The method of claim 2, further comprising:
    performing on the GPU the cross-correlation algorithm to determine how a first patch, selected among the one or more patches, is positioned in the first and second images of the plurality of images of the user.

8. The method of claim 7, wherein performing the cross-correlation algorithm on the GPU comprises:
    determining a pose of the user in the first and second images;
    performing the FFT on the first patch, wherein the FFT of the first patch is stored in a third file;
    wherein performing the FFT on the first and second images includes placing the first image in a real element of a complex number and placing the second image in an imaginary element of the complex number;
    multiplying element-wise the FFT of the first patch by the FFT of the first and second images;
    calculating an inverse FFT of the multiplied FFTs, resulting in a first score for the first image and a second score for the second image; and normalizing the result of the cross-correlation by dividing both first and second scores by the calculated variance stored in the variance file.

9. The method of claim 8, further comprising:
performing on the GPU a second cross-correlation algorithm on third and fourth images of the plurality of images of the user using the FFT of the first patch stored in the third file to determine how the first patch is positioned in the third and fourth images.

10. The method of claim 7, wherein performing on the GPU the cross-correlation algorithm further comprises
performing on the GPU the cross-correlation of each selected patch simultaneously.

11. The method of claim 1, further comprising:
determining a position of the selected feature of the first patch as a point in a virtual three-dimensional (3-D) space.

12. A computing device configured to process, by a graphical processor unit (GPU), a plurality of images of a user, comprising:
the GPU;
memory in electronic communication with the GPU;
instructions stored in the memory, the instructions being executable by the GPU to:
select, via a device with a central processing unit (CPU) and the GPU, a plurality of features detected by the GPU in a first image of the plurality of images of the user, wherein each feature comprises one or more pixels;
in a second image of the plurality of images of the user, search for the plurality of features selected in the first image;
calculate, on the GPU, a variance for each selected feature found in the second image, wherein the variance indicates a degree a portion of the second image varies from a corresponding portion of the first image;
storing the calculated variance in a variance file; and
perform on the GPU a cross-correlation algorithm, wherein performing the cross-correlation algorithm on the GPU comprises instructions executable by the GPU to:
perform, via the GPU, a fast Fourier transform (FFT) on first and second images from the plurality of images of the user, placing the first image in a real element of a complex number and placing the second image in an imaginary element of the complex number.

13. The computing device of claim 12, wherein the instructions are executable by the GPU to:
select from among the selected features in the first image one or more patches based on the calculated variance of each selected feature, wherein each patch comprises a square area of pixels centered on one of the selected features of the first image;
upon selecting the one or more patches in the first image, remove the first image from memory.

14. The computing device of claim 13, wherein the instructions are executable by the GPU to:
select the one or more patches based on a predetermined threshold of calculated variance.

15. The computing device of claim 13, wherein the instructions are executable by the GPU to:
perform on the GPU the cross-correlation algorithm to determine how a first patch, selected among the one or more patches, is positioned in the first and second images of the plurality of images of the user.

16. The computing device of claim 15, wherein performing the cross-correlation algorithm on the GPU comprises instructions executable by the GPU to:
determine a pose of the user in the first and second images;
perform the FFT on the first patch, wherein the FFT of the first patch is stored in a third file;
multiply element-wise the FFT of the first patch by the FFT of the first and second images;
calculate an inverse FFT of the multiplied FFTs, resulting in a first score for the first image and a second score for the second image; and
normalize the result of the cross-correlation by dividing both first and second scores by the calculated variance stored in the variance file.

17. The computing device of claim 16, wherein the instructions are executable by the GPU to:
perform on the GPU a second cross-correlation algorithm on third and fourth images of the plurality of images of the user using the FFT of the first patch stored in the third file to determine how the first patch is positioned in the third and fourth images.

18. The computing device of claim 15, wherein the instructions are executable by the GPU to:
perform on the GPU the cross-correlation of each selected patch simultaneously.

19. A computer-program product for processing, by a graphical processor unit (GPU), a plurality of images of a user, the computer-program product comprising a non-transitory computer-readable medium storing instructions thereon, the instructions being executable by the GPU to:
select, via a device with a central processing unit (CPU) and the GPU, a plurality of features detected by the GPU in a first image of the plurality of images of the user, wherein each feature comprises one or more pixels;
in a second image of the plurality of images of the user, search for the plurality of features selected in the first image;
calculate, on the GPU, a variance for each selected feature found in the second image, wherein the variance indicates a degree a portion of the second image varies from a corresponding portion of the first image;
store the calculated variance in a variance file; and
perform on the GPU a cross-correlation algorithm, wherein performing the cross-correlation algorithm on the GPU comprises instructions executable by the GPU to:
perform, via the GPU, a fast Fourier transform (FFT) on first and second images from the plurality of images of the user, placing the first image in a real element of a complex number and placing the second image in an imaginary element of the complex number.

20. The computer-program product of claim 19, wherein the instructions are executable by the GPU to:
perform on the GPU the first cross-correlation algorithm of each selected patch simultaneously to determine how each patch is positioned in the first and second images of the plurality of images of the user;
perform on the GPU a second cross-correlation algorithm of each selected patch simultaneously to determine how each patch is positioned in third and fourth images of the plurality of images of the user; and
normalize the results of the first and second cross-correlations by dividing the results by the calculated variance stored in the variance file.

* * * * *